(12) United States Patent
Levin et al.

(10) Patent No.: US 12,080,007 B2
(45) Date of Patent: Sep. 3, 2024

(54) AUTOMATED ACCESSIBILTY ASSESSMENT AND RATING SYSTEM AND METHOD THEREOF

(71) Applicant: 2490196 Ontario Inc., Toronto (CA)

(72) Inventors: Moshe Levin, Toronto (CA); James Schuback, Toronto (CA); Maayan Ziv, Richmond Hill (CA)

(73) Assignee: 2490196 Ontario Inc., Toronto (CA)

( * ) Notice: Subject to any disclaimer, the term of this patent is extended or adjusted under 35 U.S.C. 154(b) by 651 days.

(21) Appl. No.: 17/331,115

(22) Filed: May 26, 2021

(65) Prior Publication Data

US 2022/0383527 A1    Dec. 1, 2022

(51) Int. Cl.
| | |
|---|---|
| *G06T 7/521* | (2017.01) |
| *G06F 16/29* | (2019.01) |
| *G06F 18/25* | (2023.01) |
| *G06N 20/00* | (2019.01) |
| *G06T 11/20* | (2006.01) |

(52) U.S. Cl.
CPC .............. *G06T 7/521* (2017.01); *G06F 16/29* (2019.01); *G06F 18/251* (2023.01); *G06N 20/00* (2019.01); *G06T 11/203* (2013.01); *G06T 2207/10024* (2013.01); *G06T 2207/10028* (2013.01)

(58) Field of Classification Search
CPC ....... G06T 7/521; G06T 11/203; G06N 20/00; G06F 16/29; G06F 18/251
See application file for complete search history.

(56) References Cited

U.S. PATENT DOCUMENTS

| | | | |
|---|---|---|---|
| 9,632,671 B2 | 4/2017 | Albright | |
| 10,231,895 B2 | 3/2019 | Girardini et al. | |
| 2014/0324826 A1* | 10/2014 | Hanses | G06F 16/9536 707/722 |
| 2015/0302425 A1 | 10/2015 | Borger et al. | |
| 2019/0017835 A1 | 1/2019 | Pickover et al. | |
| 2019/0206400 A1* | 7/2019 | Cui | B25J 9/1697 |
| 2022/0070537 A1* | 3/2022 | Younessian | H04N 21/4662 |
| 2022/0383527 A1* | 12/2022 | Levin | G06V 10/803 |

FOREIGN PATENT DOCUMENTS

| | | |
|---|---|---|
| KR | 1020140113755 A | 9/2014 |
| KR | 1020190040770 A | 4/2019 |

* cited by examiner

*Primary Examiner* — Edward Park
(74) *Attorney, Agent, or Firm* — BERESKIN & PARR LLP/ S.E.N.C.R.L. s.r.l; Isis E. Caulder; Ray Kovarik

(57) ABSTRACT

An automated system and method for assessing and rating accessibility are provided. A processor collects raw data corresponding to geographical objects obtained from sensors, the raw data including tagged and non-tagged data; operates on the raw data to extract features and reduce dimensionality of the raw data, thereby generating processed data having extracted features; generates accessibility data from the processed data; uses supervised machine learning techniques to develop models from the processed data; and implements the models and generates accessibility tags based on the extracted features. A database is configured to store geographical data related to the geographical objects and the accessibility tags corresponding to the geographical locations. An API is configured to access the database and provide a user interface for a user device to use an application to display the accessibility data and the accessibility tags on the user device customized to a disability.

20 Claims, 26 Drawing Sheets

AUTOMATED ACCESSIBILTY ASSESSMENT AND RATING SYSTEM AND METHOD THEREOF

FIELD

Various embodiments are described herein that generally relate to accessibility assessment and rating systems, as well as the methods.

BACKGROUND

The following paragraphs are provided by way of background to the present disclosure. They are not, however, an admission that anything discussed therein is prior art or part of the knowledge of persons skilled in the art.

For people with disabilities to effectively use and benefit from digital technologies—to actively and equally participate in a digital age—it is useful to provide an integrated platform of information, tools, and services to help people make informed decisions that affect daily living, employment opportunities, and overall quality of life.

Accessibility means different things to different people. A noisy place might be inaccessible to someone with a hearing disability while fully accessible to someone using a wheelchair. The opposite holds true for a steps-only second floor cafe. There is need for a system that provides a full spectrum of inaccessibility rating. Such a system would allow each user to select his/her preferences and address accessibility in a broader scope.

There is a need for a system and method that provides a universally accessible, intelligent platform that guides people experiencing barriers in the built environment and addresses the challenges and/or shortcomings described above.

SUMMARY OF VARIOUS EMBODIMENTS

Various embodiments of a system and method for automating accessibility assessment and rating, and computer products for use therewith, are provided according to the teachings herein.

According to one aspect of the invention, there is disclosed an automated system for assessing and rating accessibility comprising: at least one processor; a non-transitory computer-readable medium having stored thereon instructions that, when executed by the at least one processor, cause the at least one processor to carry out the steps of: collecting raw data corresponding to a plurality of geographical objects obtained from a plurality of sensors, the raw data comprising tagged and non-tagged data; operating on the raw data to extract features and reduce dimensionality of the raw data, thereby generating processed data having extracted features; generating accessibility data from the processed data; using supervised machine learning techniques to develop models from the processed data; and implementing the models and generating accessibility tags based on the extracted features; a database configured to store geographical data related to the plurality of geographical objects and the accessibility tags corresponding to the geographical locations; and an API configured to access the database and provide a user interface for a user device to use at least one application to display the accessibility data and the accessibility tags on the user device customized to at least one of a plurality of disabilities.

In at least one embodiment, the plurality of sensors produces the raw data from sensing vision, kinematics, sound, and comprehension.

In at least one embodiment, the plurality of sensors includes at least one vision sensor comprising one or more RGB cameras for: (a) capturing amounts of light based on field of view; (b) taking snapshots at particular time intervals; and (c) encoding image data digitally across R, G, and B color channels.

In at least one embodiment, the encoding the image data comprises using RGB pixel value scales, each pixel assigned a raw numerical value per R, G, and B color channels, such that raw numerical values analyzed by digital analysis and LiDAR sensors generate a point cloud map to estimate physical distance of objects detected in a field of view in relation to the at least one vision sensor.

In at least one embodiment, the generating the accessibility data from the processed data comprises at least one of: operating on the processed data to perform monocular depth estimation for indoor accessibility, thereby adding depth estimates to the accessibility data; operating on the processed data to perform sound analysis based on criteria of spectral analysis and time fluctuation analysis, thereby adding an assessment of sound accessibility to the accessibility data; operating on the processed data to perform data fusion of text and sound, thereby adding detection of a noisy environment to the accessibility data; operating on the processed data to perform data fusion of vision and kinematics, thereby adding detection of obstacles and physical inaccessibility issues to the accessibility data; operating on the processed data to perform depth mapping, thereby adding for trail accessibility to the accessibility data; or operating on the processed data to perform object detection using LIDAR sensor data, thereby adding detection of obstacles limiting or preventing accessibility in a captured environment to the accessibility data.

In at least one embodiment, the operating on the processed data to perform data fusion of vision and kinematics comprises correlating spatial and temporal data relating to an image of an object with kinematic measures of the object, the kinematic measures of the object include a statistically significant and observable change in a kinematic sensor output.

In at least one embodiment, the operating on the processed data to perform data fusion of vision and kinematics comprises correlating spatial and temporal data relating to an image of a step or ramp with kinematic measures of the step or ramp, the kinematic measures of the step including an abrupt change in acceleration.

In at least one embodiment, the accessibility tags comprise attributes that span an accessibility space describing features of an environment containing at least one of the plurality of geographical objects that are relevant to an aspect of accessibility.

In at least one embodiment, the plurality of geographical objects includes points, lines, polylines, polygons, and polyhedrons.

In at least one embodiment, the user interface provided by the API has functionality allowing the user device to develop and implement at least one application.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
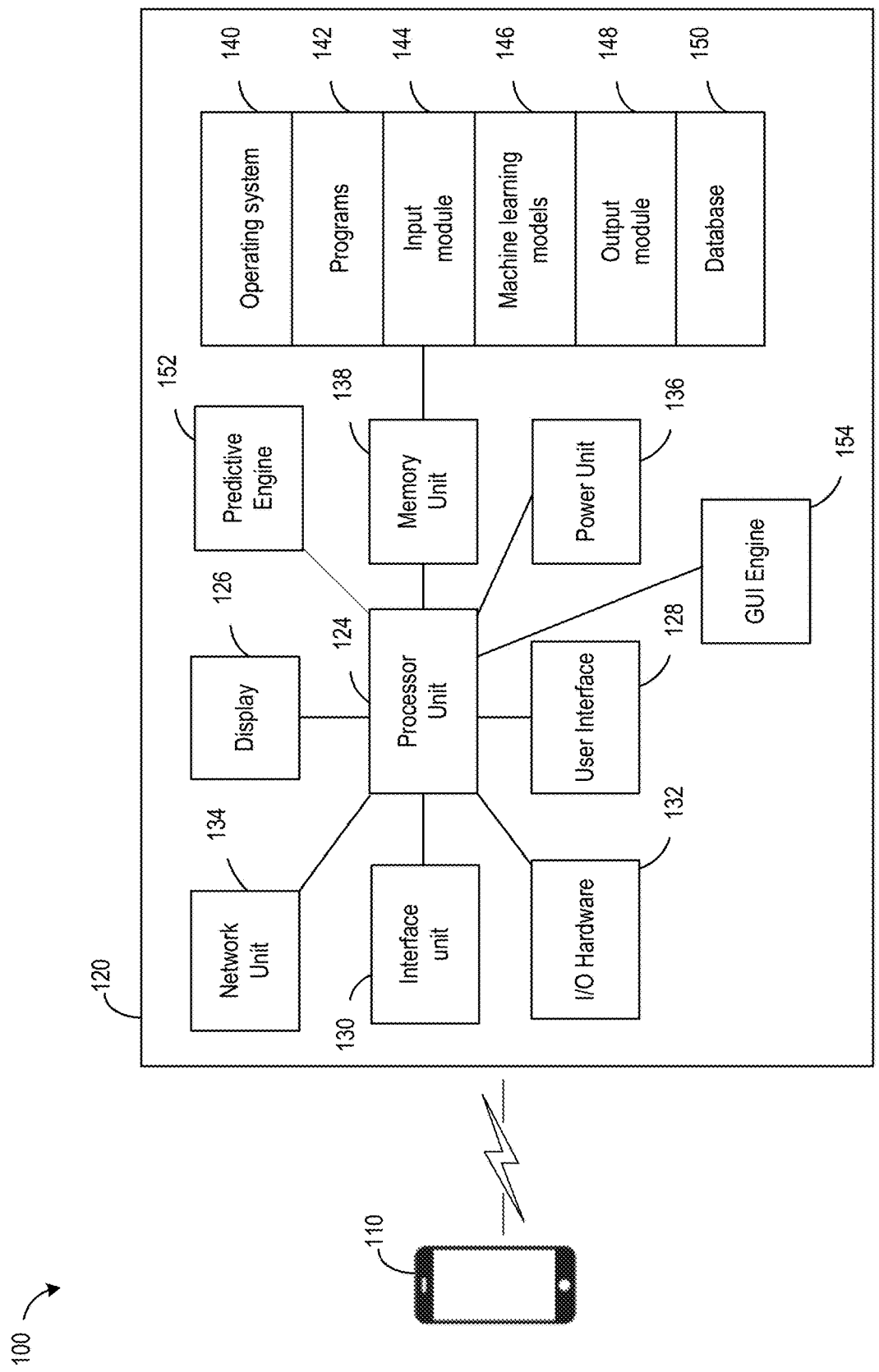
FIG. 1 illustrates an example embodiment of an automated system for assessing and rating accessibility in accordance with the teachings herein.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems, or methods having all of the features of any one of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors, or owners do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all whole numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface for performing initialization, configuration, or other user operations.

The example embodiments of the devices, systems, or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element). The hardware may comprise input devices including at least one of a touch screen, a keyboard, a mouse, buttons, keys, sliders, and the like, as well as one or more of a display, a printer, and the like depending on the implementation of the hardware.

It should also be noted that there may be some elements that are used to implement at least part of the embodiments described herein that may be implemented via software that is written in a high-level procedural language such as object-oriented programming. The program code may be written in C++, C #, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having a processor, an operating system, and the associated hardware and software that is necessary to implement the functionality of at least one of the embodiments described herein. The software program code, when read by the device, configures the device to operate in a new, specific, and predefined manner (e.g., as a specific-purpose computer) in order to perform at least one of the methods described herein.

At least some of the programs associated with the devices, systems, and methods of the embodiments described herein may be capable of being distributed in a computer program product (or equivalent, such as a smartphone app) comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer readable instructions may also be in various formats, including compiled and non-compiled code.

In accordance with the teachings herein, there are provided various embodiments for a system and method for automating accessibility assessment and rating.

One problem that affects the success of a system that automates the assessment and rating of accessibility is how to acquire the amount of information (i.e., quantity of data) it can provide. The quality and relevance must also reach a specified threshold. Crowdsourcing falls short as a sole source of information due to its limited coverage and reliability. It would be helpful to define and crystallize the overall requirements from a fully automated collection and processing system. As accessibility information is multidimensional and includes multi-sensory information (i.e., it can be extracted from images, motion sensors, sound, and texts), valuable data exists in all possible media. Such information can be pre-processed in techniques optimized to each type of media and fused into a clearly classified and rated message to a user (e.g., where the user accesses the system on a cell phone app).

A solution to the above problem is a multi-sensor system that utilizes an ensemble of kernel algorithms that feed extracted information into a Machine Learning (ML) module. This system can be used to assess and classify the accessibility of buildings, public spaces, and pathways for persons living with disabilities. Learning from the status of similar initiatives, it can be understood that a critical mass of data is required in order to be a high-quality source of information. Crowdsourcing is not able to supply it; therefore, there is a need to develop an intelligent system that can actively fetch the data from a variety of sources. In order to operate efficiently, such a system benefits from an adequate amount of tagged data that allows for efficient machine learning.

Images are two-dimensional or three-dimensional data digitally captured and encoded providing a limited view of the real world. Machine learning and artificial intelligence algorithms, with their accompanying software implementations, can contribute to improved applications of image recognition, scene recognition, and activity recognition.

Video data extends the concept of images to an ordered list over time whereby images are captured sequentially at a sampling rate, often on the order of many images per second, for example at 24 FPS (frames per second). The third dimension of 'time' in video data provides opportunities for AI algorithms to create causal predictions and control flows. This can contribute to improved applications of robot control and self-driving cars. These hybrid applications combine insights from visual sensors (e.g., cameras, LIDAR, etc.) as inputs to real-time controllers which predict and choose actions accordingly based on the proposed application goals.

Reference is first made to FIG. 1, showing block diagram of an example embodiment of an automated system 100 for assessing and rating accessibility. The system 100 includes at least one user device 110 and at least one server 120. The user device 110 and the server 120 may communicate, for example, wirelessly or over a wired network.

The user device 110 may be a computing device that is operated by a user. The user device 110 may be, for example, a smartphone, a smartwatch, a tablet computer, a laptop, a virtual reality (VR) device, or an augmented reality (AR) device. The user device 110 may also be, for example, a combination of computing devices that operate together, such as a smartphone and a sensor. The user device 110 may also be, for example, a device that is otherwise operated by a user, such as a drone, a robot, or remote-controlled device; in such a case, the user device 110 may be operated, for example, by a user through a personal computing device (such as a smartphone). The user device 110 may be configured to run an application (e.g., a mobile app) that communicates with other parts of the system 100, such as the server 120.

The server 120 may run on a single computer, including a processor unit 124, a display 126, a user interface 128, an interface unit 130, input/output (I/O) hardware 132, a network unit 134, a power unit 136, and a memory unit (also referred to as "data store") 138. In other embodiments, the server 120 may have more or less components but generally function in a similar manner. For example, the server 120 may be implemented using more than one computing device or on a computing cloud.

The processor unit 124 may include a standard processor, such as the Intel Xeon processor, for example. Alternatively, there may be a plurality of processors that are used by the processor unit 124, and these processors may function in parallel and perform certain functions. The display 126 may be, but not limited to, a computer monitor or an LCD display such as that for a tablet device. The user interface 128 may be an Application Programming Interface (API) or a web-based application that is accessible via the network unit 134. The network unit 134 may be a standard network adapter such as an Ethernet or 802.11x adapter.

The processor unit 124 may execute a predictive engine 152 that functions to provide predictions by using machine learning models 146 stored in the memory unit 138. The predictive engine 152 may build a predictive algorithm through machine learning. The training data may include, for example, image data, video data, audio data, and text.

The processor unit 124 can also execute a graphical user interface (GUI) engine 154 that is used to generate various GUIs. The GUI engine 154 provides data according to a certain layout for each user interface and also receives data input or control inputs from a user. The GUI then uses the inputs from the user to change the data that is shown on the current user interface, or changes the operation of the server 120 which may include showing a different user interface.

The memory unit 138 may store the program instructions for an operating system 140, program code 142 for other applications, an input module 144, a plurality of machine learning models 146, an output module 148, and a database 150. The machine learning models 146 may include, but are not limited to, image recognition and categorization algorithms based on deep learning models and other approaches. The database 150 may be, for example, a local database, an external database, a database on the cloud, multiple databases, or a combination thereof.

In at least one embodiment, the machine learning models 146 include a combination of convolutional and recurrent neural networks. Convolutional neural networks (CNNs) are designed to recognize images, patterns. CNNs perform convolution operations, which, for example, can be used to classify regions of an image, and see the edges of an object recognized in the image regions. Recurrent neural networks (RNNs) can be used to recognize sequences and patterns, such as text, speech, and temporal evolution. Therefore, RNNs can be applied to a sequence of data to predict what will occur next. Accordingly, a CNN may be used to read what is happening on a given image at a given time, while an RNN can be used to provide an informational message.

The programs 142 comprise program code that, when executed, configures the processor unit 124 to operate in a particular manner to implement various functions and tools for the system 100.

Figure 2:
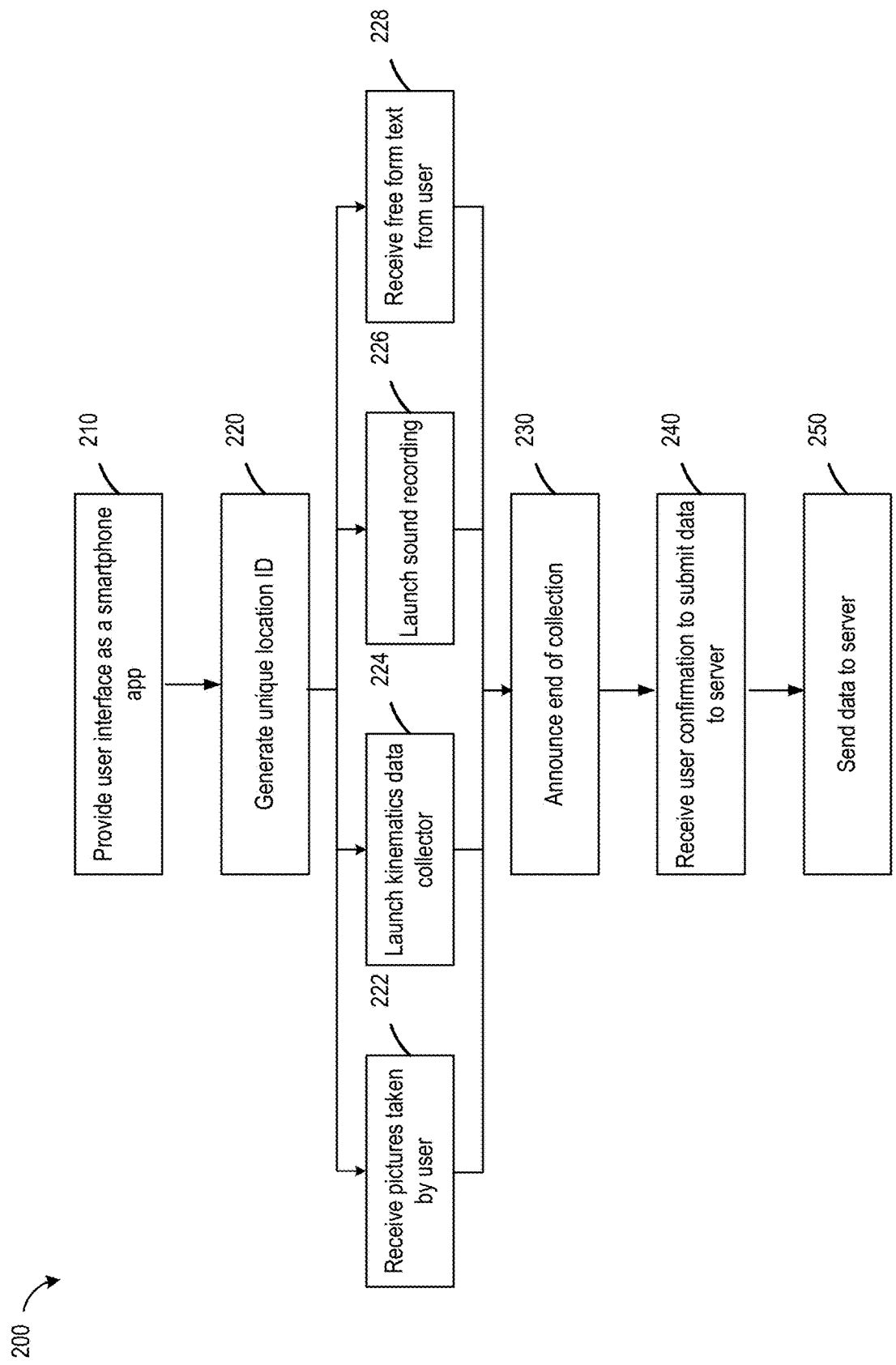
FIG. 2 shows a flow chart of an example embodiment of a method for automated assessment and rating of accessibility from the perspective of a user device in the system of FIG. 1.

Referring to FIG. 2, shown therein is a flow chart of an example embodiment of a method 200 for automated assessment and rating of accessibility from the perspective of a user device in the system 100. The method 200 describes the functions of the system 100 from the application/data collection side.

At 210, a user device 110 receives input from a user to activate an application (e.g., a mobile app). The application can then initiate the collection of background data.

At 220, the application receives input from the user device 110 to start a location/place review. This can be the result, for example, of the user tapping on a dedicated "Create new place" button on the user device 110. This action can generate a new entry to the database 150. The application can then automatically enter geolocation information and timestamps to the appropriate fields in the database 150.

At 222, the application receives image input from the user device 110. This can be the result, for example, of the user taking a series of pictures on the user device 110. The application stores the image input in the database 150.

At 224, the application autonomously records kinematic parameters and stores them in the database 150.

At 226, the application autonomously records audio files according to a preset pattern. The application can store pointers to the audio files in the place entry.

At 228, the application provides a dedicated interface on the user device 110 that allows the user to enter free-form text review of the location. The application can store the text in the appropriate field of the database entry.

At 230, the application receives input from the user device 110 signifying the closing of data entry. This can be the result, for example, of the user tapping on a "Close" button on the user device 110. The application can then store a timestamp and location information in the appropriate field of the database 150.

At 240, the application receives input from the user device 110 confirming the data. This can be the result, for example, of the user tapping "Upload" or "Trash" to mark the data.

At 250, the application packs the data under the unique ID and sends the data to the server 120.

Figure 3:
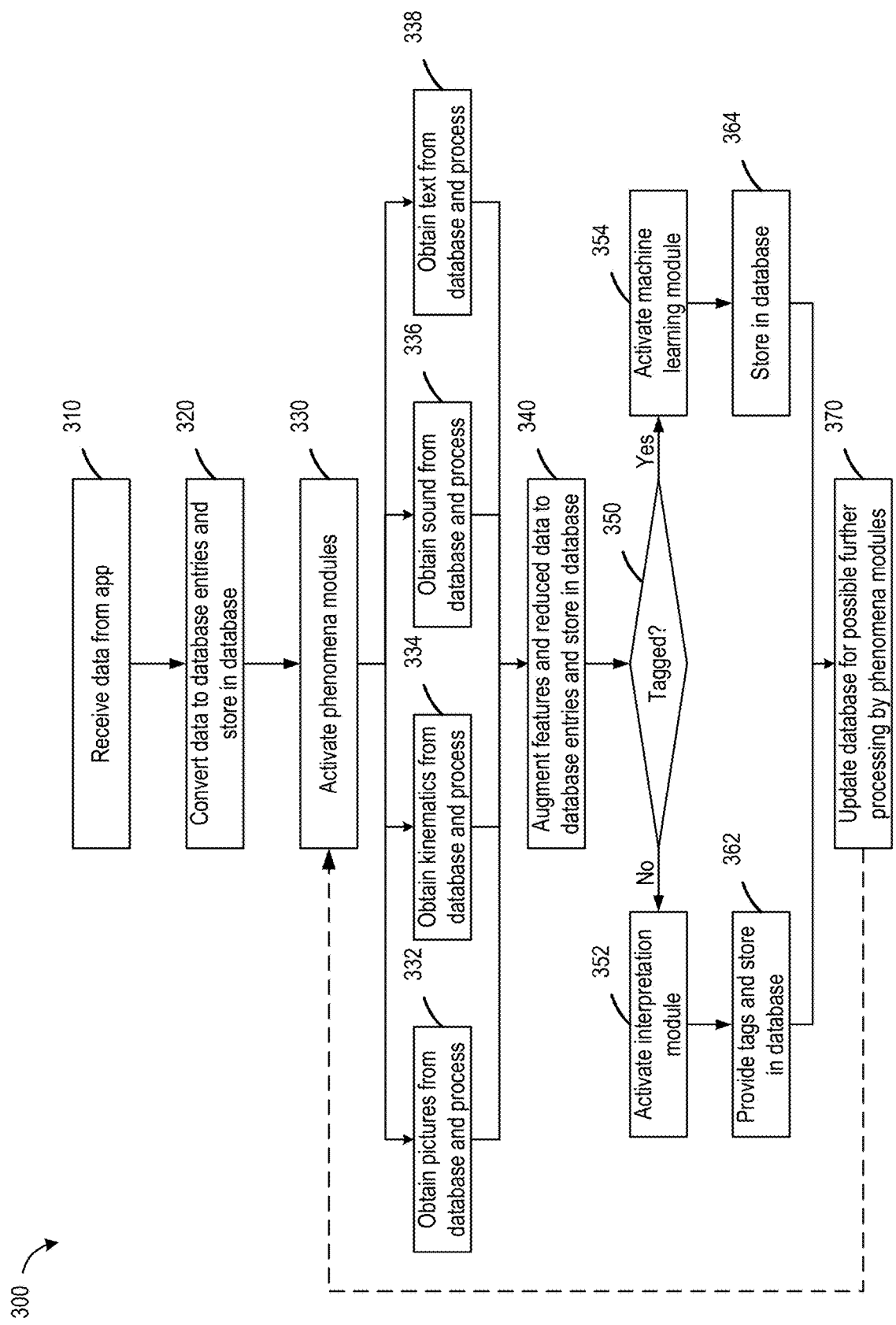
FIG. 3 shows a flow chart of an example embodiment of a method for automated assessment and rating of accessibility from the perspective of a server in the system of FIG. 1.

Referring to FIG. 3, shown therein is a flow chart of an example embodiment of a method 300 for automated assessment and rating of accessibility from the perspective of a server in the system 100. The method 300 describes the functions of the system 100 from the server 110 side (which may also be referred to as the "backend side".

At 310, the server 120 receives data from the application. The server 120 may then trigger the import process. The server 120 may also archive the trashed data.

At 320, the server 120 converts place data to a single database entry in the database. The entry fields may contain the geolocation coordinates of the place (e.g., point, polyline), descriptive information (e.g., name, address, free text). The server 120 may file the entry fields with pointers to the recorded data generated at 222, 224, and 226. The server 120 may store the entry field, for example, on a local storage device or in the cloud.

At 330, the server 120 activates phenomena processes with the new place ID.

At 332, the server 120 activates a vision analysis unit. The vision analysis unit pulls images and other relevant data from the storage, processes the images and/or relevant data, and generates extracted features and reduced data.

At 334, the server 120 activates a kinematic analysis unit. The kinematic analysis unit pulls kinematic records and other relevant data from the storage, processes the kinematic records and/or relevant data, and generates extracted features and reduced data.

At 336, the server 120 activates a sound analysis module. The sound analysis module pulls sound records files from the database 150, processes the sound records, and generates extracted features.

At 338, the server 120 activates a text analysis module. The text analysis module extracts files and generates extracted features and tags.

At 340, the server 120 stores the reduced data in the storage and stores the pointers in the database fields. The server 120 stores the extracted features and tags in the database 150.

At 350, the server 120 checks if the information is tagged. If the information is tagged, the method 300 proceeds to 354. If the information is not tagged, the method 300 proceeds to 352.

At 352, the server 120 activates an interpretation module.

At 354, the server 120 activates a machine learning module.

At 362, the interpretation module applies the learned models to generate the accessibility tags. The interpretation module stores the accessibility tags in the database 150.

At 364, the machine learning module uses the tagged data to improve the learned models.

At 370, the server 120 stores tagged information in the database 150. The server 120 makes the tagged information available via a dedicated API.

Visual data is a useful component of the cognitive engine with regards to providing data related to accessibility and mapping. In practical terms, those with disabilities (such as mobility impairment and requirement of a wheelchair or other assistive device(s)) need to be provided with an understanding of the physical characteristics of a location and the associated interactions with their device(s), whether it is a storefront, sidewalk, or park trail. With the ability to collect, interpret, and analyze visual data, it is possible to provide such insights to a user living with a disability.

Figure 4:
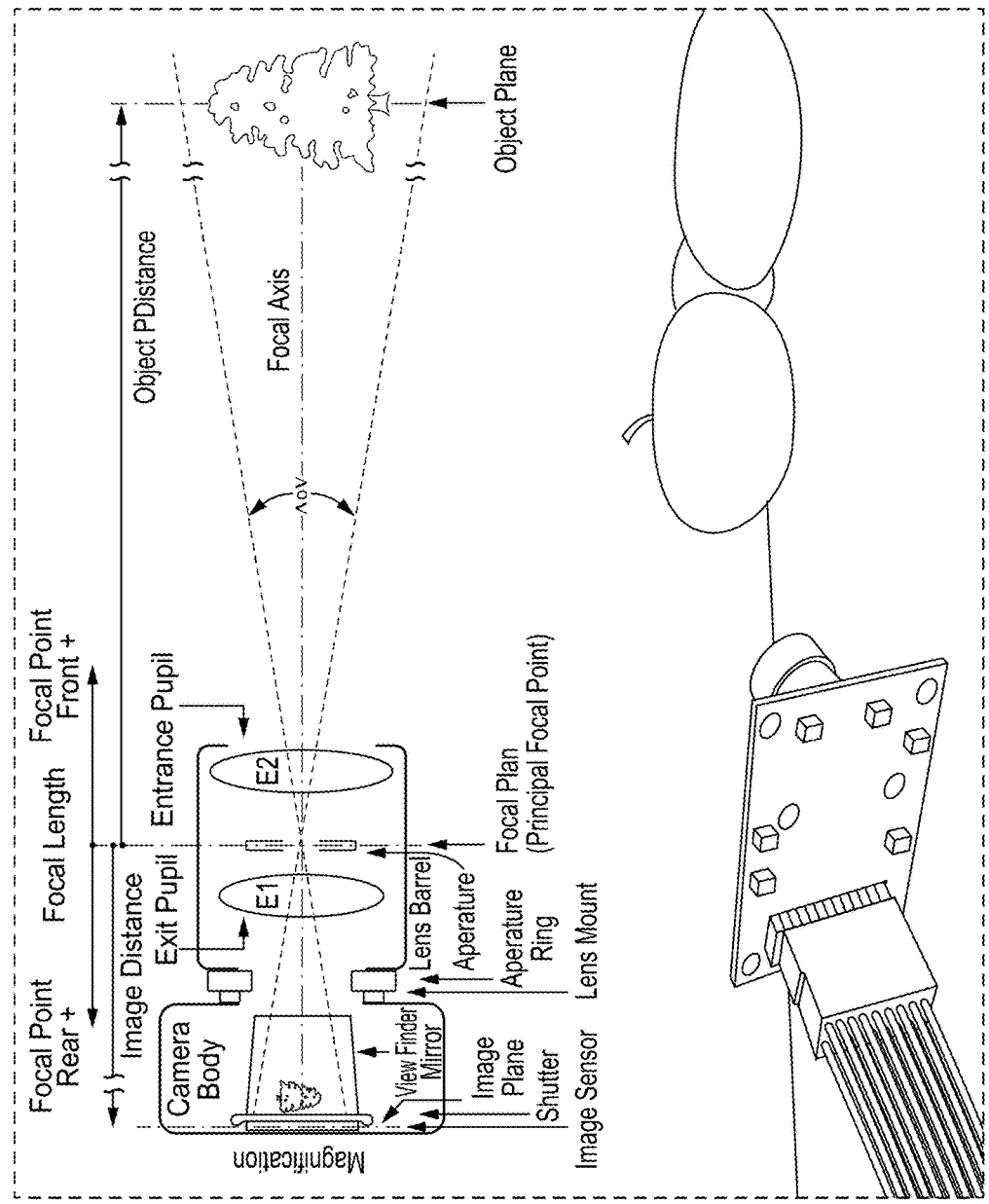
FIG. 4 shows a diagram of an example use of an RGB camera in the system of FIG. 1.

The primary visual sensors that can be used are RGB cameras and LIDAR sensors. In the case of RGB cameras, digital cameras capture various amounts of light through lenses based on the available field of view, and then encodes this information digitally. FIG. 4 shows an example 400 of how RGB cameras are used.

Figure 5:
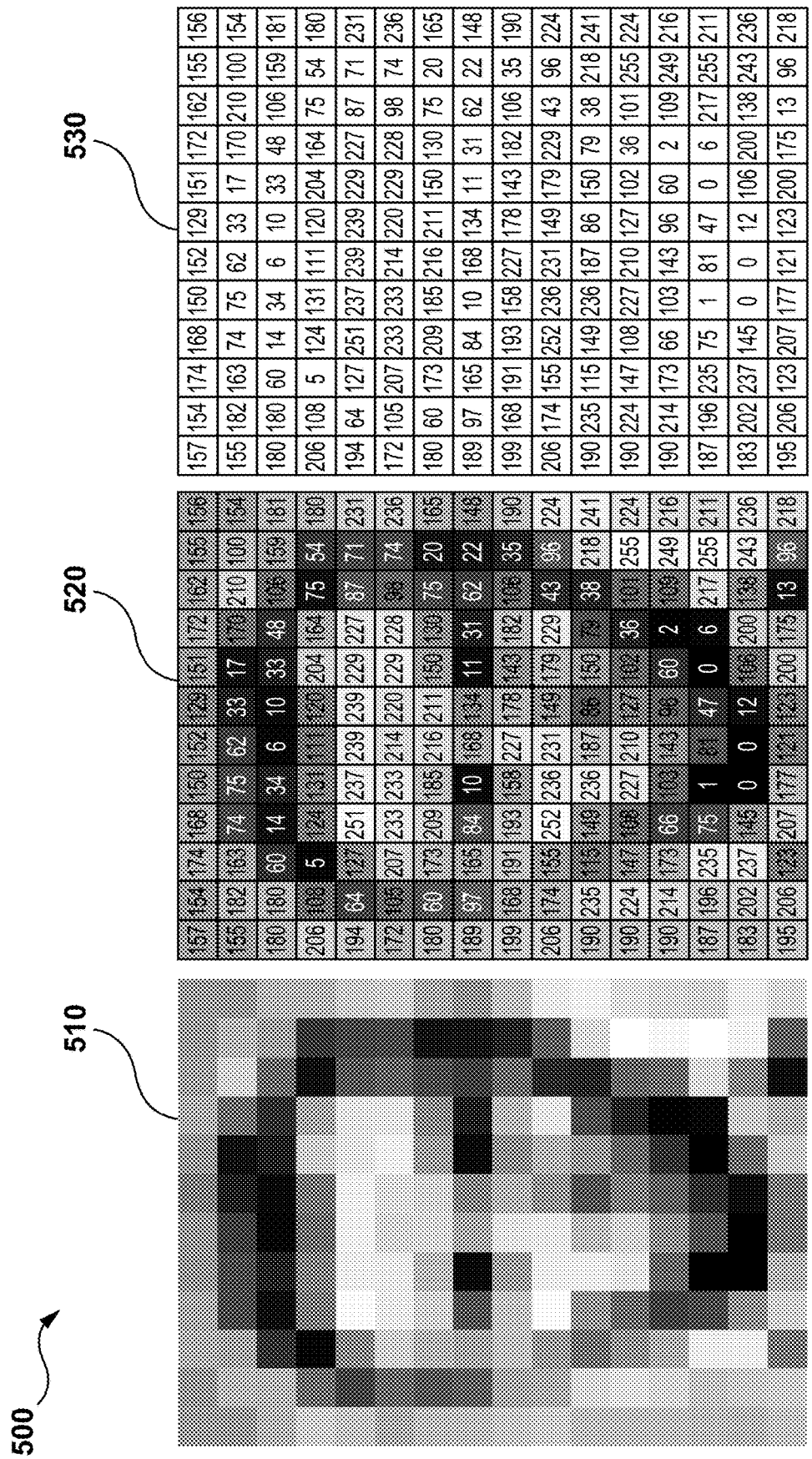
FIG. 5 shows a sequence of illustrations of the contents of a single channel in the RGB camera for use with the system of FIG. 1

Snapshots are sampled at a time interval (typically measured in frames per second) and may use the 'RGB' or 'Red-Green-Blue' pixel value scales to encode information across 3 color channels. Every pixel may then have a raw numerical value per channel, typically an integer between 0 and 255. FIG. 5 shows an example of how a single channel may appear.

An image is characterized by its width and height characteristics, or 'resolution' in more common nomenclature. For example, '1080p' typically refers to 1920 pixels in width and 1080 pixels in height per image frame, for a total of 1920×1080 pixels. Each pixel may have 3 channel values corresponding to the amount of Red, Green, and Blue present. FIG. 5 shows an example 500 of a low-resolution breakdown of a segment of an image 510, and the corresponding pixel data for a single channel 520. These raw numerical values 530 may be the inputs to the aforementioned digital analysis machine learning and artificial intelligence algorithms.

Figure 6:
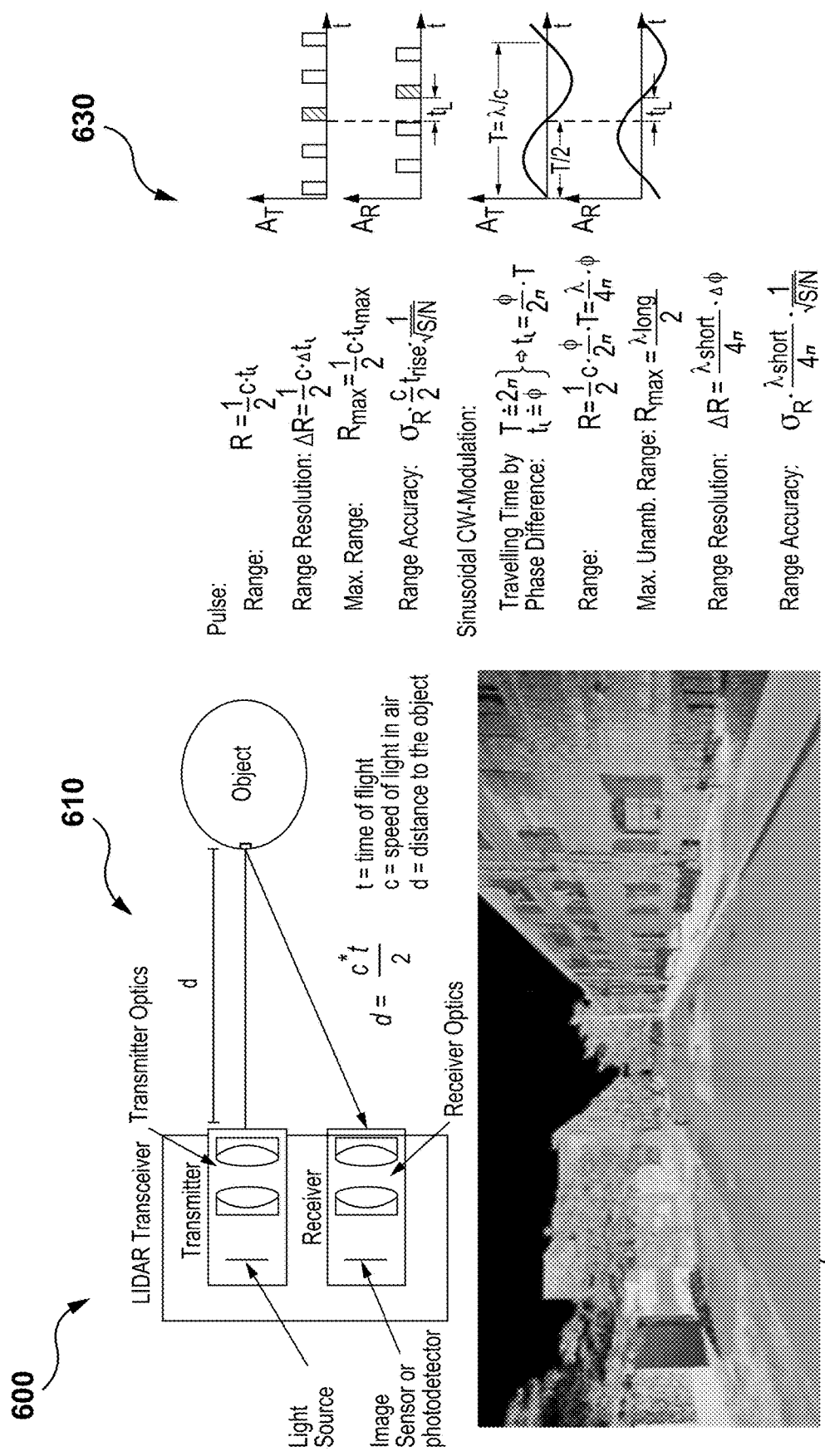
FIG. 6 shows an example diagram and image with related formulas for a LiDAR for use with the system of FIG. 1.

Referring to FIG. 6, shown therein is an example diagram and image with related formulas 600 for a LiDAR. LiDAR is also known as "light detection and ranging" or "laser imaging, detection, and ranging". LiDAR uses various wavebands of light to detect images and objects in terms of relative distance in relation to the sensor 610. It may be used in a wide array of applications, such as self-driving cars. By sending out pulses of light and measuring the time taken for them to be reflected and returned to the sensor, an estimate of distance can be made.

Similar to other digital cameras, LIDAR sensors generate a pixel map 620 for a given resolution. But instead of capturing color band RGB values, the LIDAR sensor, at every pixel, estimates the physical distance of whatever is detected in its field of view, relative to the sensor 630. This notion of 3-dimensional distance can be important in determining if there are objects such as cars or pedestrians in front of the sensor, if a road ahead is bumpy, or if a sidewalk has obstacles, etc.

The system 100 may use data generated from these described sensors as inputs to a cognitive software system that determines if a given area is physically accessible or not. Such information can be of importance to a person with a disability, and by automating the process of creating such an ever-expanding "accessibility map", such persons can reliably determine ahead of time if their trip will be accessible.

Figure 7:
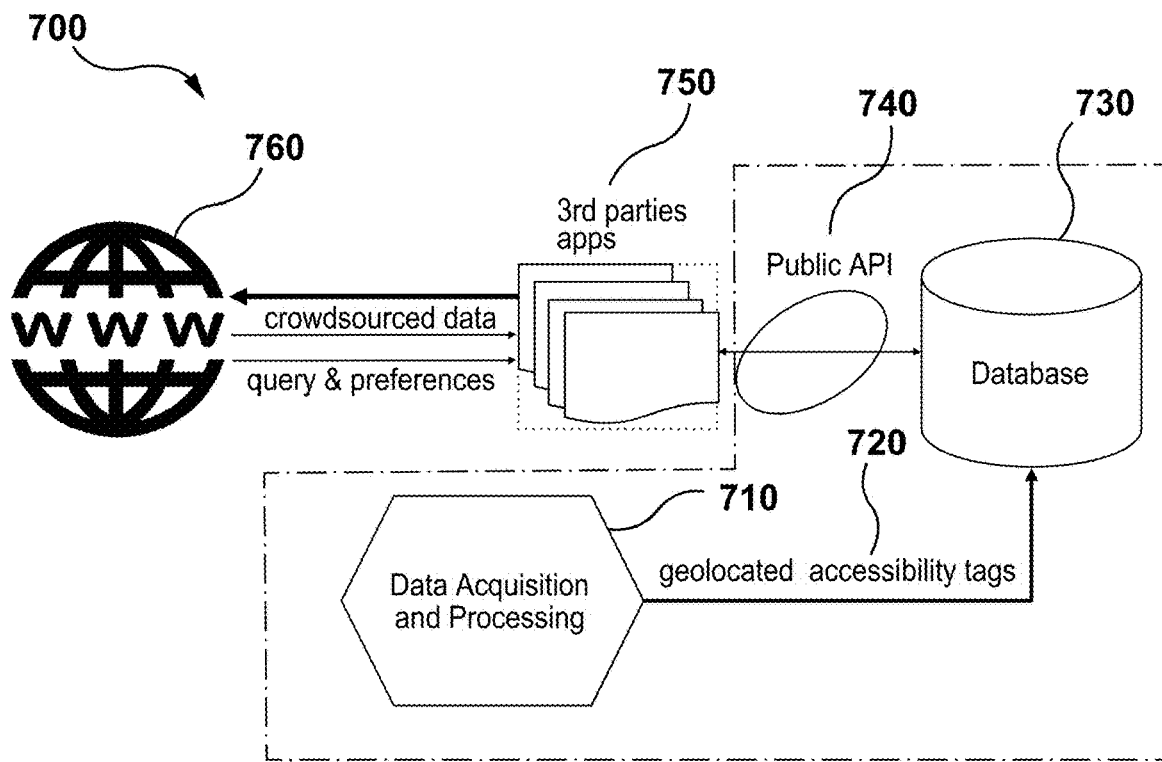
FIG. 7 shows a block diagram of an example embodiment of an environment in which is implemented the system of FIG. 1.

Referring to FIG. 7, shown therein is a block diagram of an example embodiment of an environment 700 in which is implemented the system 100. The environment 700 consists of a data acquisition and processing unit 710, a database 730 and an application programming interface (API) 740 that interfaces a plurality of applications 750, that may be created by third party vendors. These applications 750 may provide and and/or collect information from web users 760.

The data acquisition and processing unit 710 collects information from an accessibility space using a variety of sensors in a variety of media, processes the information, and extracts a variety of accessibility tags 720. The accessibility tags 720 are the world aspects of points of interest that the system 100 is sensing and learning. The accessibility space can be divided into two aspects: (1) the type or class of accessibility; and (2) the level of accessibility. The classes of accessibility can be divided into a finite number of discrete categories, each relevant to a subset of users. A useful functionality of the system 100 is to address the variety in the accessibility aspects of the users. The system 100 stores the accessibility tags 720 in the database 730 and makes them accessible via the public API 740. In other words, the accessibility tags 720 are attributes that span the accessibility space describing features of the environment that are relevant to any aspect of accessibility. Examples of such features include: the existence of an automatic door that is relevant to wheelchair users; or tactile signs (raised print & braille) which are mandatory for people with visual impairments. Additional accessibility tags 720 may include, for example, ramp, accessible parking, service animal friendly, accessible washroom, scent-free, and elevator.

The database 730 is a geographical database that contains for each entity (i.e., data entry) a name and address of the entity, any other relevant information, and a list of the accessibility tags 720.

The database 730 supports geographical data types, such as (1) a point defined by a single longitude and latitude coordinates; and (2) a set of a polyline, defined as a sequential list of points with coordinates (e.g., longitude, latitude). In other words, the geographical data types may be viewed as representing geographical locations, using the latitude and longitude coordinates of a place at that location and its address.

The database 730 may have an API that allows third party developers to develop and implement a range of applications that make the collected information usable to a broad scope of disabilities. Some possible applications include: a simple geographical query; a voice enhanced interface; Braille support; or a chat box.

Figure 8:
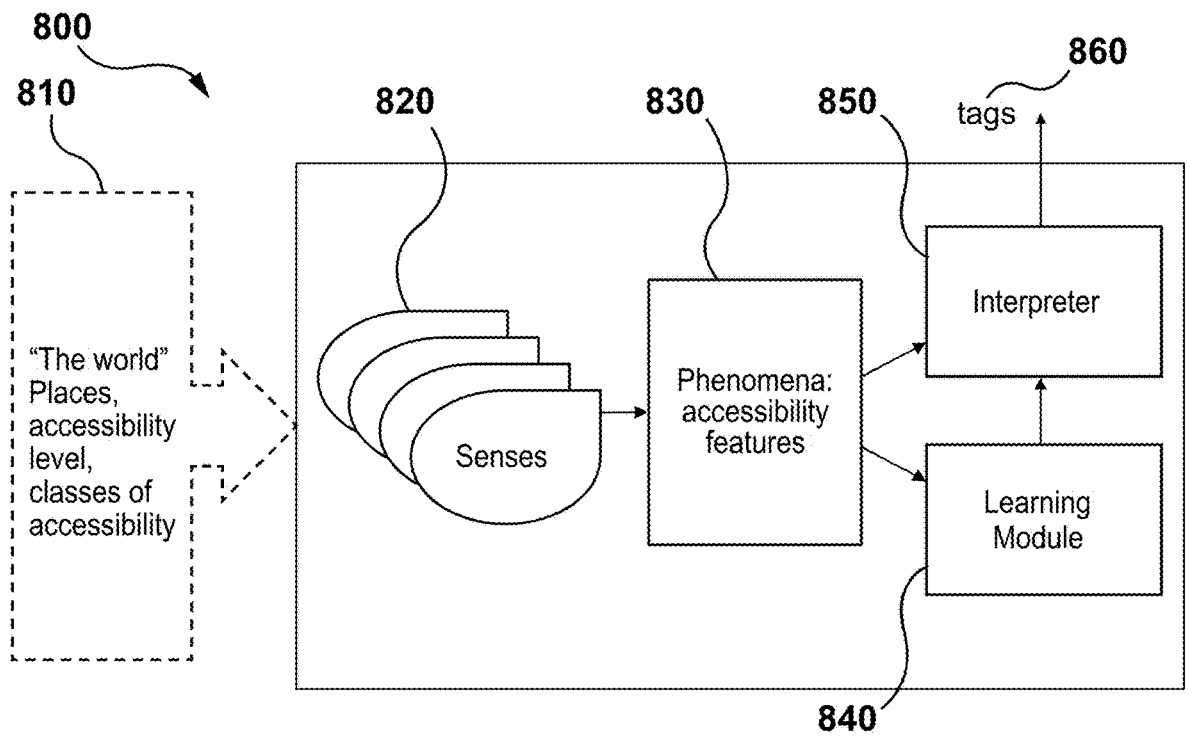
FIG. 8 shows a block diagram of an example embodiment of a data acquisition and processing unit for use with the system of FIG. 1.

Referring to FIG. 8, shown therein is a block diagram of an example embodiment of a data acquisition and processing unit 800. The data acquisition and processing unit 800 handles the collection of data from a variety of media sources. The data can be tagged (i.e., classified with an accessibility attribute) or not tagged. A phenomena engine 830 can process the tagged and non-tagged raw data collected by the sensors 820 and perform a plurality of dimension reduction and feature extraction functions resulting in processed data. A machine learning module 840 may use the tagged processed data to be trained to extract the tags from non-tagged data in the learning mode of operation by applying a set of machine learning algorithms to build a model that once constructed, can be implemented by an interpreter 850 to extract the tags out of the collected non-tagged data.

The data acquisition and processing unit 800 collects raw information 810 of a geographical location using a variety of media via a plurality of sensors 820. The sensors 820 transform the raw information to raw data in digital form. The phenomena engine 830 applies to the raw data collected in each media a dedicated set of algorithms that extract features and reduce the dimensionality of the data. The sensors 820 collect raw information in the senses domains. Examples of such sensors are: 2D camera and 3D LiDAR for vision; accelerometer for kinematics; microphone for sound; and text files for comprehension. The phenomena engine 830 may receive the raw data, perform feature extraction, and perform dimension reduction. The processed information is forwarded to the machine learning module 840 or the interpreter 850.

The data acquisition and processing unit 800 conveys tagged extracted data to the machine learning module 840. The machine learning module may apply supervised learning techniques to develop a model that can provide the tagged data from non-tagged data. This model may be implemented in the interpreter 850 that generates tags 860 for a geolocation and forwards them to the database. The interpreter 850 may implement the learned model to calculate the tags 860 out of the processed data (i.e., the phenomena). The interpretation for each tag may be accomplished by dedicated data fusion models performed over more than one sensor data. For example, a first tag of "noisy" can be evaluated by fusing textual information and a sound recording. Also, for example, a second tag of "ramp" may be evaluated by fusing textual information with vision, kinematic, and geolocation information.

Figure 9:
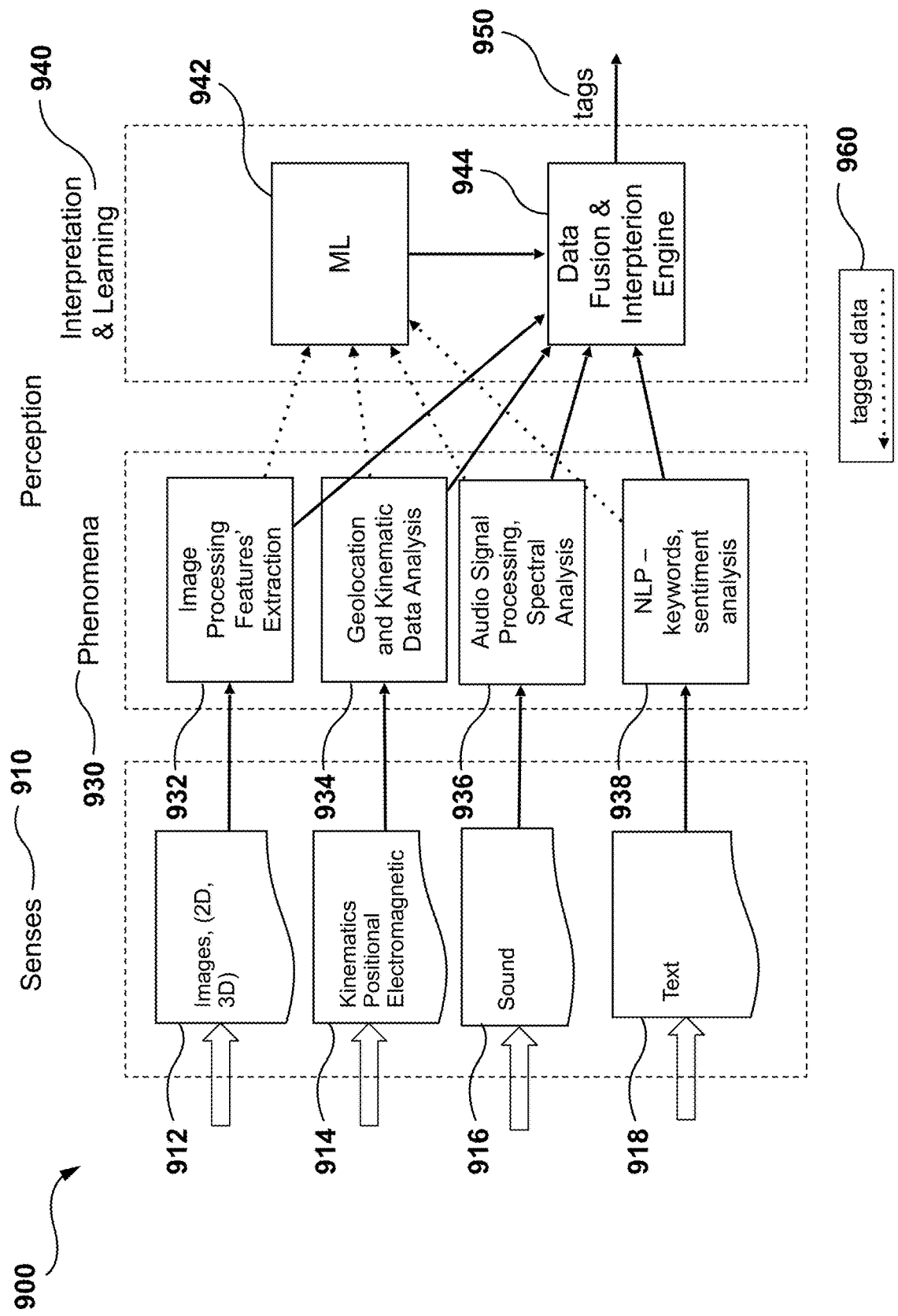
FIG. 9 shows a block diagram of an example embodiment of data flow to and from the modules used by the system of FIG. 1.

Referring to FIG. 9, shown therein is a block diagram of an example embodiment of data flow 900 to and from the modules used by the system 100. The data flow 900 includes data produced by devices for obtaining senses data 910, the devices receiving media signals from capturing apparatuses. The senses data 910 can be divided into one or more components: vision 912, kinematics 914, sound 916, and comprehension 918. Vision 912 includes imaging sensors. For example, the imaging sensors can be: (1) a phone-mounted 2D camera that provides standard images; (2) a panoramic image; or (3) a 3D image (e.g., cloud points) generated by a phone-mounted LiDAR or dedicated 3D camera. Kinematics 914 includes one, a few, or even multiple (e.g., 10 or more) sensors for kinematics, geolocation, and electromagnetic signals. Sound 916 includes a microphone or an array of microphones to assess a variety of accessibility sound characteristics. Comprehension 918 includes natural language processing (NLP) to analyze written text from a variety of sources and extract relevant information based on the analysis.

A phenomena engine 930 receives the sensors' raw data in a digital form from a senses component (e.g. one of the senses data 910) and performs pre-processing (e.g., filtering), feature extraction, and noise reduction 932, 934, 936, 938. The phenomena engine 930 provides a technical benefit since it condenses and purifies the huge amount of information contained in the raw data and emphasizes the features that are the subject of the learning and classification process. In practice, the data may be reduced by at least three orders of magnitude, therefore decreasing the amount of information to be processed by the learning and interpretation modules, resulting in significantly higher performance of these modules and significantly reduces the probability of overfitting.

Once the data is reduced and the relevant features are extracted, an interpretation and learning module 940 fuses the data from the sensors and converts the data to accessibility tags 950. This may be done in two steps: (1) learning, where tagged data is introduced to a machine learning (ML) module 942; and (2) implementation, where a data fusion and interpretation module 944 implements the model with a stream of data and generates the tags 950 (i.e., tagged data 960)

Figure 10:
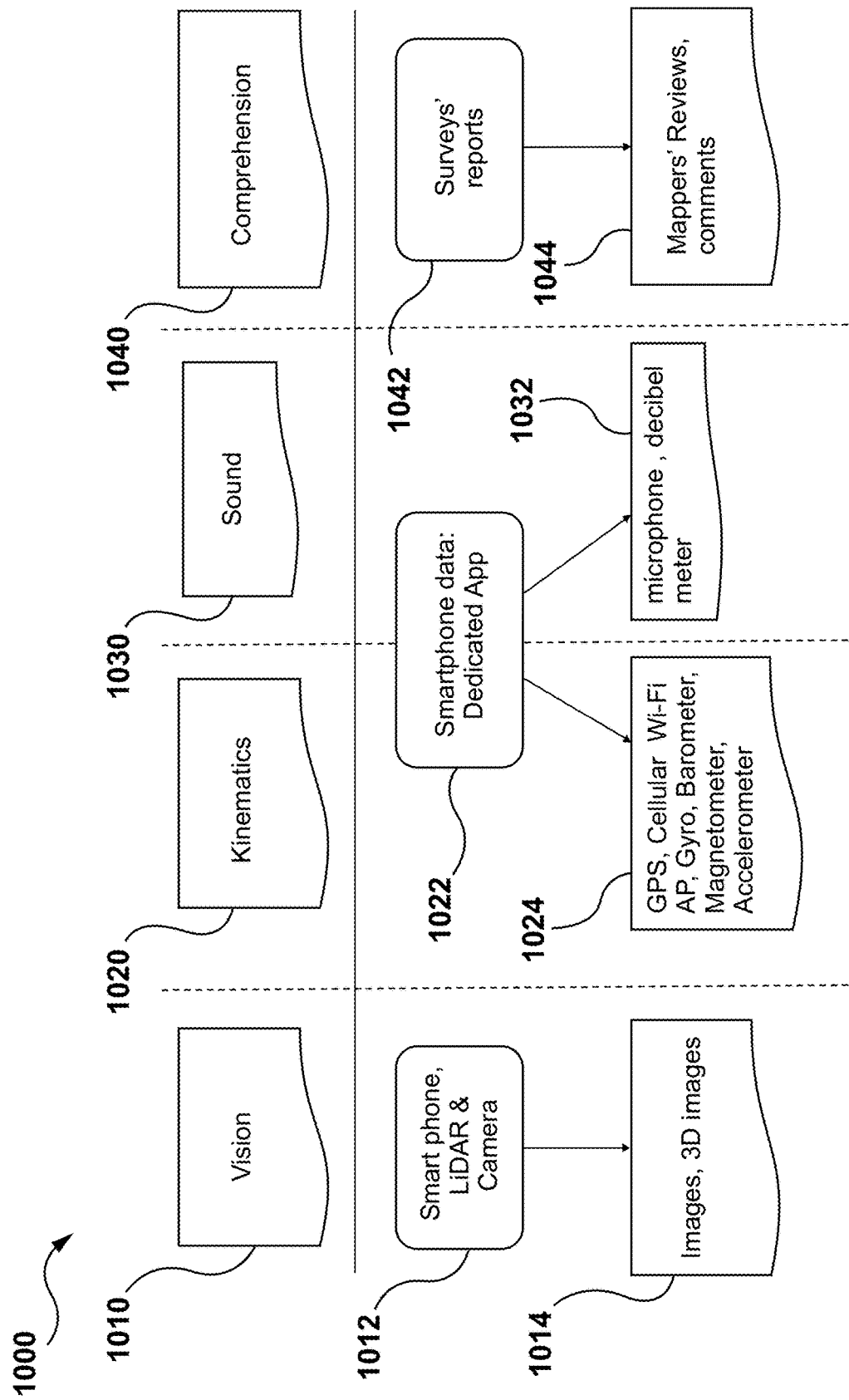
FIG. 10 shows a block diagram of an example embodiment of data flow for collecting tagged data from the senses data within the system of FIG. 1.

Referring to FIG. 10, shown therein is a flow chart of an example embodiment of data flow 1000 within the system 100 for collecting tagged data from the senses data. The system 100 collects tagged data from one or more of the senses components (e.g., sensors), extracts the features, and forwards the features to the Machine Learning module. The senses components include vision 1010, kinematics 1020, sound 1030, and comprehension 1040.

The tagged data can be collected, for example, by surveys, crowdsourcing, and extracted tags. A survey is a process of collecting data using a dedicated app that logs and timestamps the relevant data of the four senses. In crowdsourcing, information is obtained by a public app user. This information might be partial. In case of extracted tags, the phenomena engine can tag data. This happens once there is clear evidence for the tag in the data steam. For example, detection of the text: "not accessible to wheelchair" or "very noisy" will automatically tag all the applicable information originating from that place.

The system 100 may collect data in the survey using dedicated applications. The vision component 1010 may collect information using a smartphone camera (image and LiDAR) and/or dedicated LiDAR camera 1012. The output of these collection tools includes, for example, standard 2D images and 3D point clouds 1014.

The kinematics component 1020 and sound component 1030 collect information using dedicated applications, which may be installed on a standard smartphone 1022, for example. The output may include files with all kinematic and geolocation data 1024 (e.g., GPS, cellular, Wi-Fi AP, gyro, barometer, magnetometer, accelerometer), audio files with calibrated sound recordings, and/or measured sound levels 1032 (e.g., microphone, decibel meter).

The comprehension component 1040 applies dedicated algorithms to the processing of text. The comprehension component 1040 collects information from sources of text, such as surveys' reports 1042. The output may include mappers' reviews and/or comments 1044.

Figure 11:
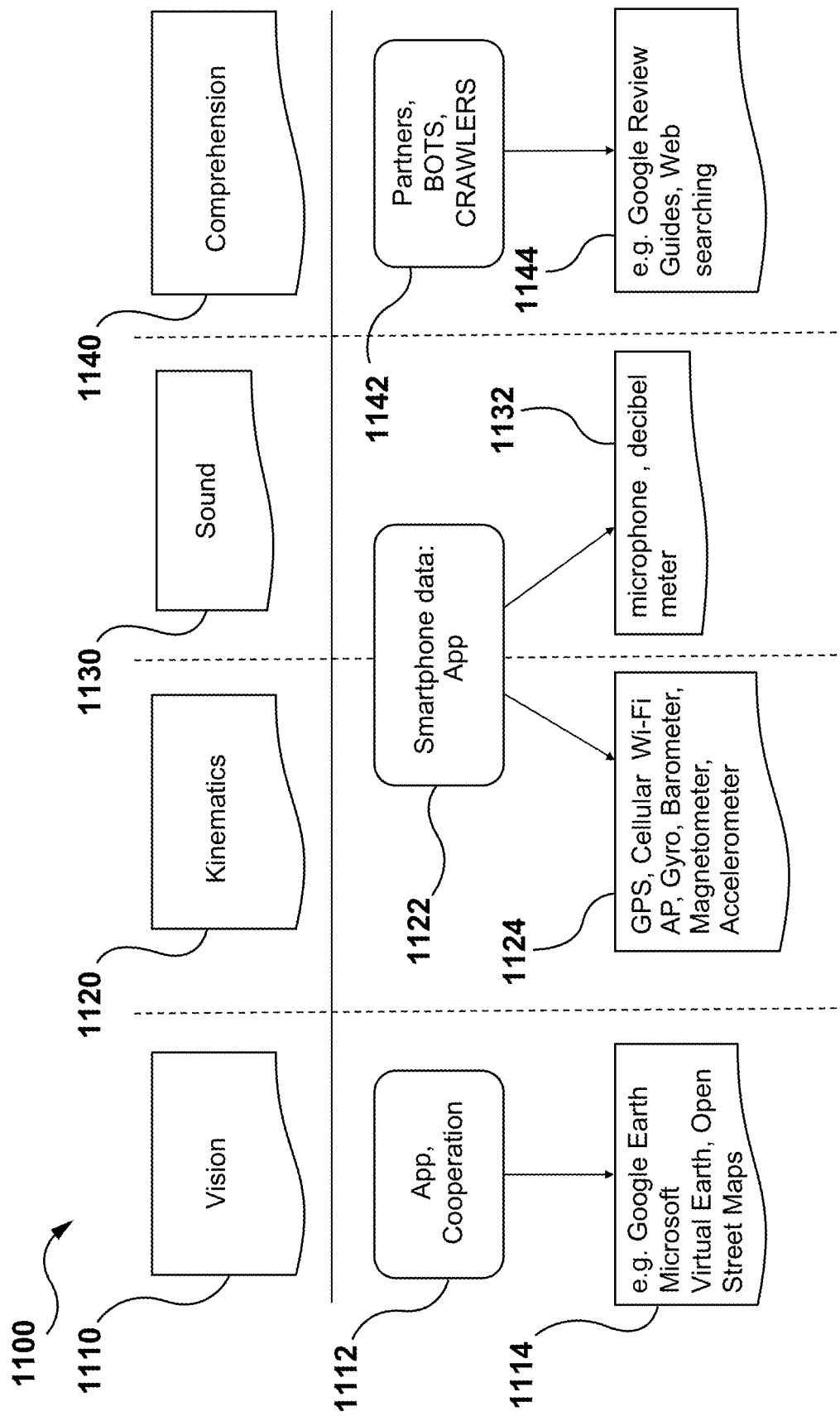
FIG. 11 shows a block diagram of an example embodiment of a production workflow for use by the system of FIG. 1.

Referring to FIG. 11, shown therein is a flow chart of an example embodiment of a production workflow 1100 within the system 100. The production workflow 1100 collects and processes information from a variety of sources, including images, sound records, and text. The sources of this information may be divided into two distinct groups: raw data and data collected by dedicated applications. Raw data is data that already exists and is used by other applications. The raw data includes one or more of vision 1110, kinematics 1120, sound 1130, and comprehension 1140. Vision 1110 may include street images (e.g., Google/Microsoft/Apple), indoor locations (e.g., TripAdvisor, hotel bookings) and more. Comprehension (text) 1140 may include crowd-sourced reviews on public locations (Google/Microsoft/TripAdvisor/dedicated blogs).

A dedicated application for vision 1112 collects visual data, such as images/point clouds (3D). This visual data can come from various image data sources 1114, such as Google Earth, Microsoft Visual Earth, or Open Street Maps.

A dedicated application for kinematics and sound 1122 collects kinematic and sound data. This data can come from various kinematic and geolocation data 1124 and/or audio records 1132. The kinematic and geolocation data 1124 may include, for example, GPS, cellular, Wi-Fi AP, gyro, barometer, magnetometer, and/or accelerometer data. The audio records 1132 may include, for example, microphone readings and/or decibel meter readings.

A dedicated application for comprehension 1142 collects text from reviews 1144 (e.g., obtained from partners, bots, or crawlers). The reviews may include, for example, Google reviews, guides, web search results.

The system 100 may forward information collected by the dedicated applications to the interpreter that utilizes the learned model in order to extract accessibility tags.

Figure 12:
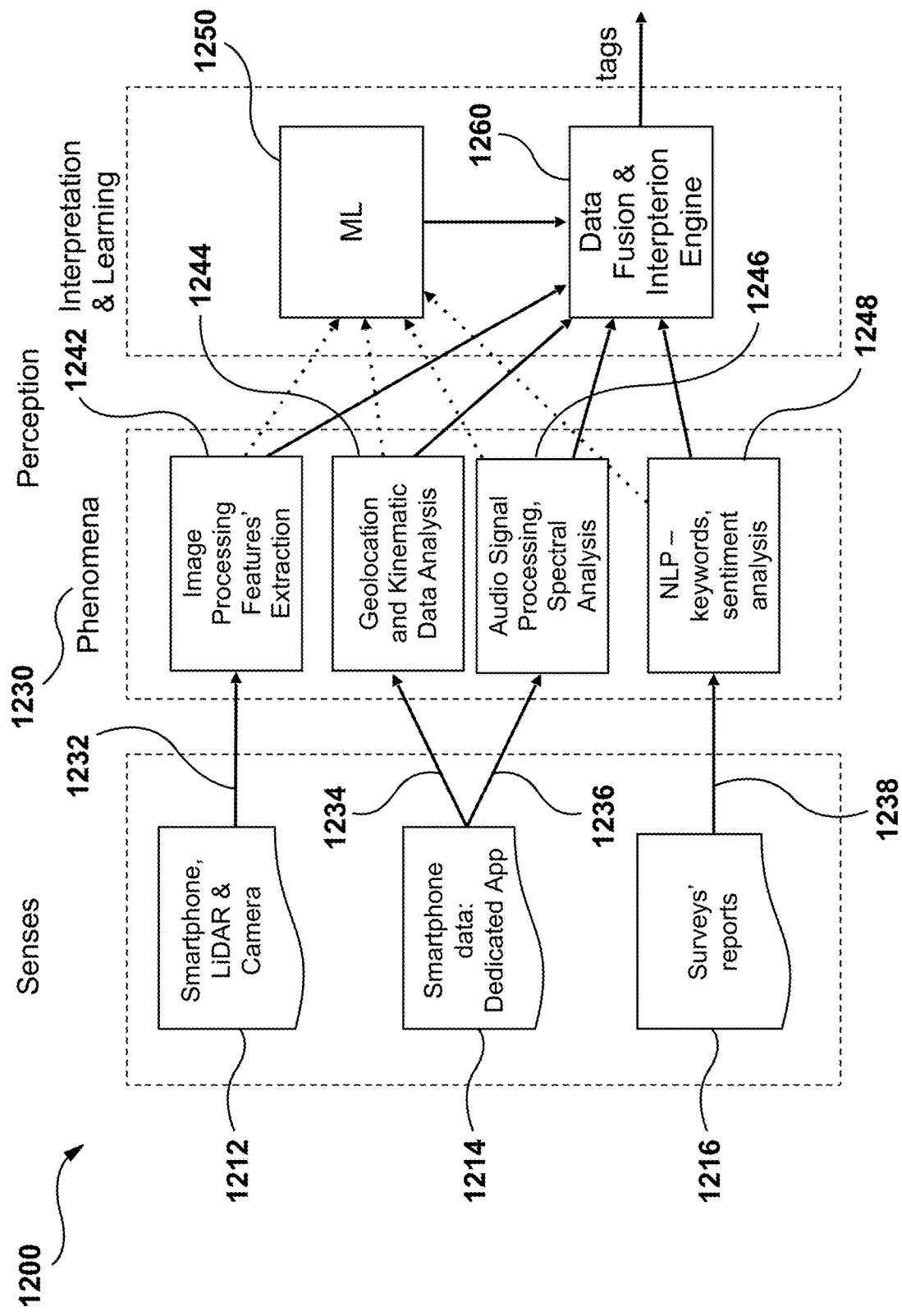
FIG. 12 shows a block diagram of an example embodiment of data flow from the input sources used by the system of FIG. 1.

Referring to FIG. 12, shown therein is a flow chart of an example embodiment of data flow 1200 from the input sources used by the system 100. The system 100 handles a variety of pieces of information including, for example, location, business information, images, sound, and text. The size of these pieces of information may vary by a number of orders of magnitude (e.g., from bytes to megabytes). Further, there may be improvements in efficiency to have information that is collected through different means interconnected to support the data fusion process. To regulate the information flow in the system 100, the system 100 may use a combination of a standard database augmented by local (or remote) storage. For example, both the database may be an SQL type of database and the storage may be cloud-based storage like Microsoft Azure or Amazon AWS-S3.

The database entry is the unit of information, and in its fields contains all relevant information of the geographical entity. For example, four data fields, for images 1232, kinematic 1234, sound 1236, text 1238 may contain pointers to locations in the storage where the whole data is stored. Additional fields may contain pointers to the extracted features and reduced data (or "phenomena" 1230), the learned model and the extracted data. The extracted data may be generated by a data fusion & interpretation engine 1260.

The phenomena 1230 may include data related to the images 1232, such as image processing features' extraction 1242. The phenomena 1230 may include data related to kinematics 1234, such as geolocation and kinematic data analysis 1244. The phenomena 1230 may include data related to sound 1236, such as audio signal processing and spectral analysis 1246. The phenomena 1230 may include data related to text 1236, such as NLP—keywords, sentiment analysis 1248.

Consequently, since all the data of a location is encapsulated in a database entry, the information that is forwarded in the system 100 is a unique entry ID in the database. Each component in the system 100 adds the relevant information to this entry. Once the process is completed, the system 100 makes available a stripped version of the entry to 3rd party applications via a dedicated public API (e.g., public API 740 in FIG. 7).

The geographical location fields can include a unique entry ID, data acquisition time tag, name of the geographical object, address, location type (e.g., point, polyline, polygon, polyhedron), geographical coordinates (latitude, longitude, or any other standard projection), tags (if applicable), textual identification of the information sources, and pointers to data files stored in a dedicated storage.

An example of the vision information flow is shown in FIG. 12 as going through vision senses 1212, data related to images 1232, and image processing features' extraction 1242. The system 100 may collect information related to vision senses 1212 from one or more of the following sources:

a. A standardized 2D image format like bmp (Bitmap Image format), jpeg (Joint Photographic Experts Group format), or png (Portable Network Graphics format). The files may be generated by a physical camera or received from a third party as a file;

b. Any standard image file with panoramic metadata support; and c. A standardized point cloud formats, such as ASCII, binary, or hybrid (e.g., ASCII XYZ, E57).

The system 100 may acquire information related to vision senses 1212 from dedicated hardware like a smartphone camera and LiDAR device, or from a digital repository of 2D and 3D images. The system 100 may store the image data in the storage and insert the pointers into the appropriate field of the location's unique entry with the following fields 1232. The system 100 may forward the image data to the image processing and feature extraction module (932 in FIG. 9). The image processing module (932 in FIG. 9) adds to the appropriate fields in the location's unique entry the applicable data, such as extracted features (tags). For example, an extracted feature may have a feature ID of "geographical object", having the characteristics of a point, coordinates, and a time stamp (e.g., of the feature detection); the feature type and attributes may be a step (e.g., estimated height) and rough terrain (e.g., a roughness measure).

The system 100 may forward the visual information to a learning module 1250 and the data fusion module 1260 (942 and 944 respectively in FIG. 9).

An example of the kinematic information flow is shown in FIG. 12 as going through kinematic and audio senses 1214, data related to kinematics 1234, and geolocation and kinematic data analysis 1244. The system 100 may collect information related to the kinematic senses 1214 from one or more sources by a dedicated application that, for example, can be installed on any Android or iPhone smartphone. The application may write the data to comma separated text files (CSV). The name of the file may include a timestamp in the format: YYYYMMDDhhmmss (e.g., where 20210324151820 means 24 Mar. 2021, 15:18 and 20 seconds). The collected data related to kinematics 1234 may include, for example, motion data files, electromagnetic files, and geolocation data files.

Examples of motion data files include:
accelerometer_20210324151820.csv
barometer_20210324151820.csv
gravity_20210324151820.csv
gyroscope_20210324151820.csv
linear_aracceleration_20210324151820.csv
magnetometer 20210324151820.csv
Examples of electromagnetic data files include:
wifi_20210324151820.csv
cellular 20210324151820.csv
Bluetooth_20210324151820.csv
An example of a geolocation data file (e.g., GPS coordinates) includes:
geolocation_20210324151820.csv The system 100 may load the data files to the storage and store the pointers in the appropriate fields in the unique locations entry.

The kinematic and data processing module (934 in FIG. 9) processes that data. The system 100 stores the resulting processed data 1244 in the storage with the appropriate pointers added to the fields in the unique location entry.

An example of the sound information flow is shown in FIG. 12 as going through sound senses 1214, data related to sound 1236, and audio signal processing and/or spectral analysis 1246. The system 100 may collect information related to the sound data 1214 using a dedicated application that, for example, can be installed on any Android or iPhone sound-calibrated smartphone. The application may write the data to a file with a standard sound format (e.g., mp3, m4a, way). The name of the file may include a timestamp in the format: YYYYMMDDhhmmss (e.g., where 20210324151820 means 24 Mar. 2021, 15:18 and 20 seconds. The system 100 may store these files in the storage with appropriate pointers inserted to the unique location's entry 1236. The system 100 may forward the to the audio signal processing and spectral analysis module (936 in FIG. 9).

The audio signal processing and spectral analysis module extracts relevant sound parameters and stores them in the appropriate fields of the relevant location's entry 1246 and forwards it to the machine learning module 1250 and data fusion module 1260 (942 and 944 respectively in FIG. 9).

An example of the textual data information flow is shown in FIG. 12 as going through textual senses 1216, data related to text 1238, and NLP— keywords, sentiment analysis 1248. The system 100 may collect information related to the textual senses 1216 by a dedicated web application. The system 100 may store the data in standard text files. The system 100 may store these files in the storage with appropriate pointers inserted to the unique location's entry 1248.

The system 100 may forward the data to the NLP— keywords, sentiment analysis module (938 in FIG. 9).

The NLP— keywords, sentiment analysis module extracts relevant textual information and tags (if applicable) and stores it in the appropriate fields of the relevant location's entry 1248 and forwards it to the machine learning module 1250 and data fusion module 1260 (942 and 944 respectively in FIG. 9)

Figure 13:
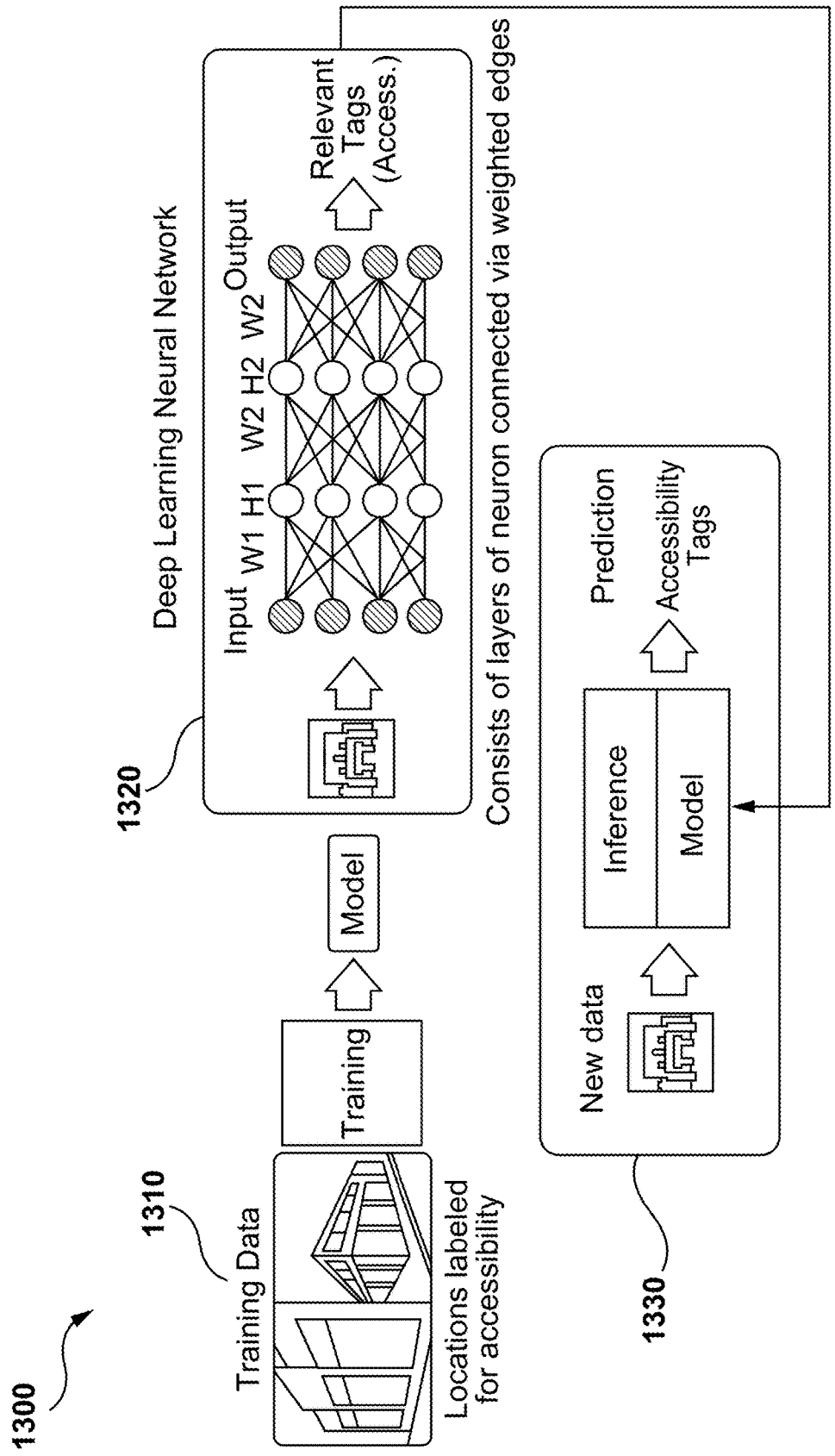
FIG. 13 shows an illustration of an example embodiment of a vision algorithm architecture for use with the system of FIG. 1.

Referring to FIG. 13, shown therein is a block diagram of an example embodiment of a vision algorithm architecture 1300. The system 100 makes use of visual data as described above to provide intelligent predictions pertaining to accessibility for a given environment. To do this, a pipeline is formed with the goal of transforming raw visual inputs into categorized accessibility tags for a variety of scenarios 1310, from common city outdoor features (e.g., roads, sidewalks, ramps, gaps, doors) to more rural environments such as trails and parks.

The system 100 may use an entrance accessibility component, which uses an artificial neural network (ANN) to analyze visual data to determine a storefront entrance's accessibility to those with mobility disabilities. The ANN automatically detects certain features as being present or not, as well as a few continuous scale features. These include, but are not limited to, door width, presence of a ramp, presence of an automatic opening button/control, presence of stairs or other obstacles, etc.

The ANN may be implemented as a convolutional neural network (CNN).

An exemplary CNN analyzes image data, utilizing a modified activation function and network architecture appropriate to the spatial multi-dimensional data structure. Feature maps are obtained by convolving the input with a learned kernel and then applying an element-wise nonlinear activation function on the convolved results. In order to generate each feature map, the kernel is shared by all spatial locations of the input. The complete feature maps are obtained by using several different kernels—there can exist variations to fine-tune networks towards desired effects. Mathematically, the feature value z at location (i, j) in the k-th feature map of the l-th layer is specified and computed as:

$$z_{i,j,k}^{l} = W_k^{l^T} X_{i,j}^{l} + b_k^{l}$$

where $x_{i,j}$ is the input (image) pixel value at location (i,j), w is the CNN weight in the k-th feature map of the l-th layer, and b is the CNN k-th feature bias. T represents the matrix transpose operation.

The proceeding activation is a nonlinear function a( ) applied to the above quantity, and the network consists of various repeated layers of this process. Such architectures allow analysis of relevant portions of visual data, extracting features and combining in hierarchical fashion to then correlate towards desired output quantities, such as accessibility tags. For every predicted output during the training process, a loss function L is computed as a function of the parameters ⊖, predicted outputs y, an arbitrary function I and desired outputs o, for N layers:

$$L = \frac{1}{N}\sum_{n=1}^{N} l(\theta; y^{(n)}, o^{(n)})$$

Figure 14:
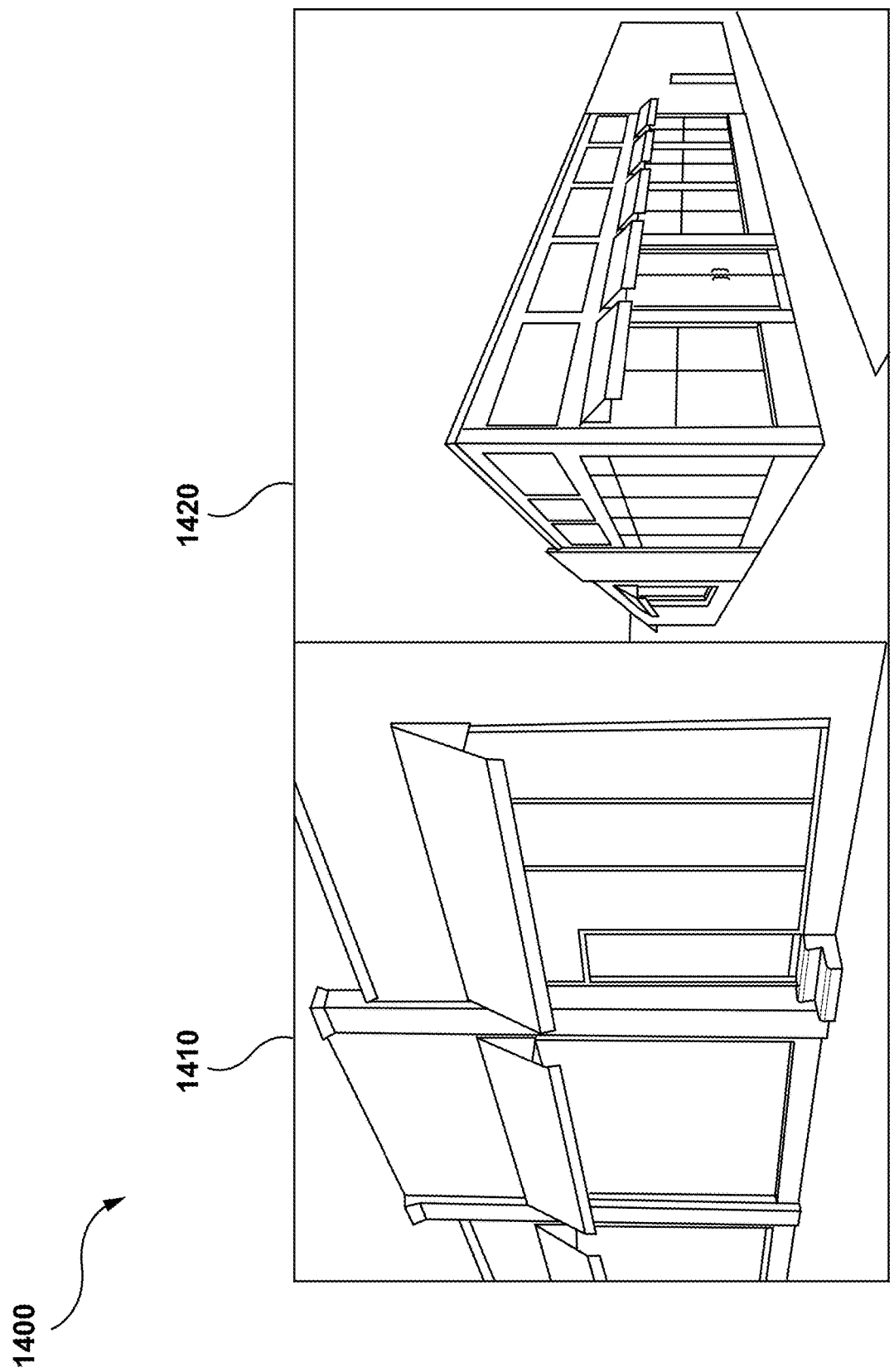
FIG. 14 shows example images used by the vision algorithm architecture of FIG. 13.

The training process then updates the parameters of the network through the optimization of this loss function, thereby yielding increasingly accurate output predictions to match the target labels collected as ground truth 1320. From there, the network can take novel images as inputs and output inference predictions, allowing an automated tagging of accessibility for various store fronts 1330. FIG. 14 illustrates two such examples, where the left image 1410 is of an inaccessible storefront due to the steps, while the storefront image in the right 1420 appears to be accessible due to flat ramps and wide doors.

The system 100 may use a visual recognition neural networks which is pre-trained to compute many relevant low-level image features, such as edges, blobs, corners, angles, gradients, and more. The system 100 may use a neural network that is pre-trained on mid-level features; these can begin to form the outline of many common objects. The system 100 herein may use transfer learning to take advantage of such features and enable easier and more accurate classification to be done on newly designated datasets, such as storefront accessibility.

Figure 15:
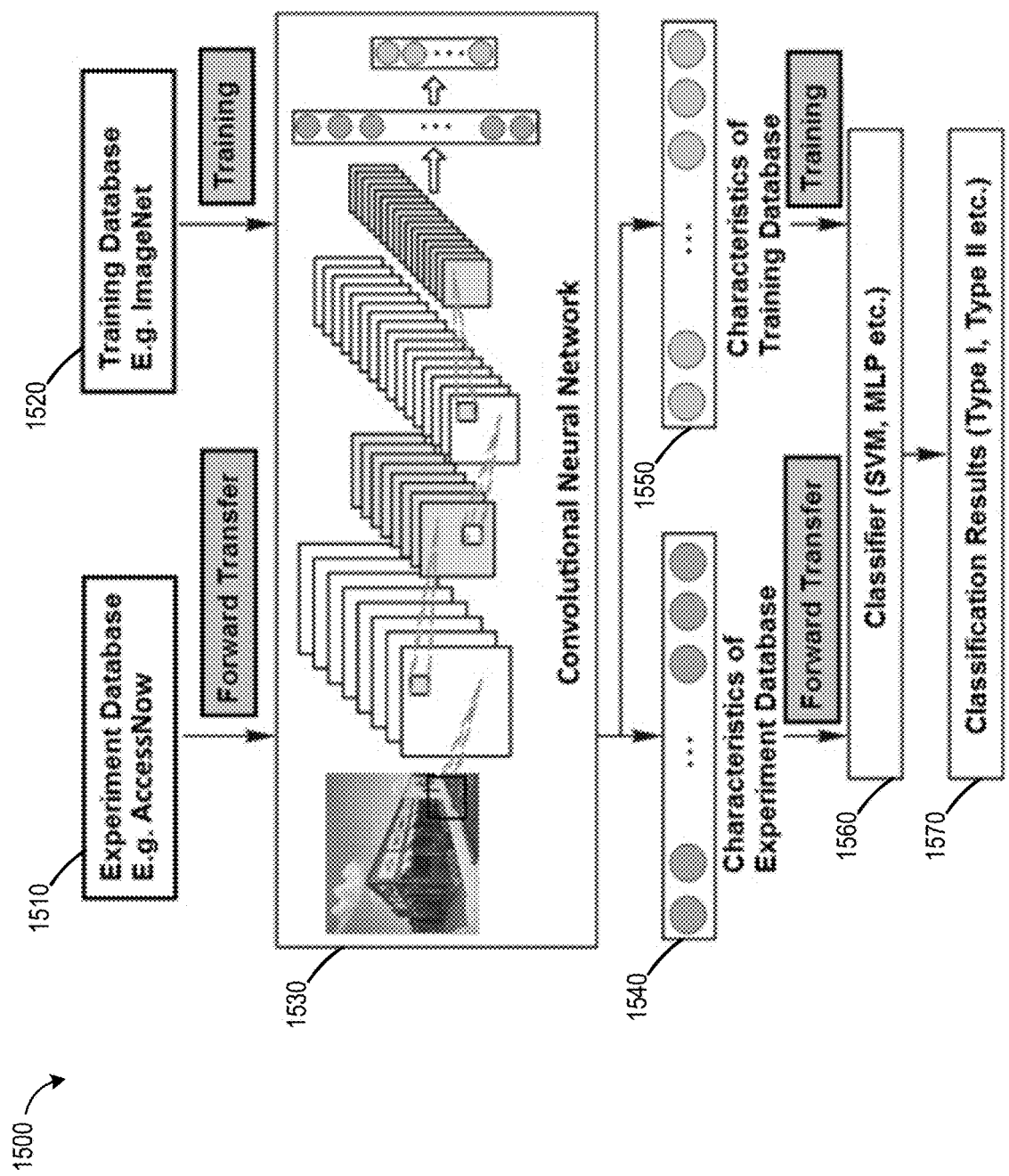
FIG. 15 shows a block diagram of example embodiment of an architecture of a convolutional neural network for use with the system of FIG. 1.

An example architecture 1500 for a CNN 1530 for use with the system 100 is illustrated in FIG. 15. An experimental database 1510 (e.g., AccessNow) provides forward transfer into the CNN 1530. A training database 1520 (e.g., ImageNet) provides training data for the CNN 1520. The CNN 1530 outputs characteristics of the experiment database 1540 by way of forward transfer into a classifier 1560 (e.g., SVM, MLP). The CNN 1530 outputs characteristics of the training database 1550 by way of training data into the classifier 1560. The classifier 1560 provides classification results 1570 (e.g., type I, type II).

The system 100 may combine external data sources for images with such custom-built and modified neural networks. These data sources include images from review websites, mapping services, and web search services. To get labeled data, the system 100 may use a combination of manually labeled data and user-generated data cross-referenced from a base mobile application. One of the cognitive system's functions is to crawl the web and classify for accessibility many existing locations which regular persons without disabilities take for granted and use every day. Popular review websites, food and restaurant websites, social media websites, etc., are leveraged as data sources, given available API functionality.

Figure 16:
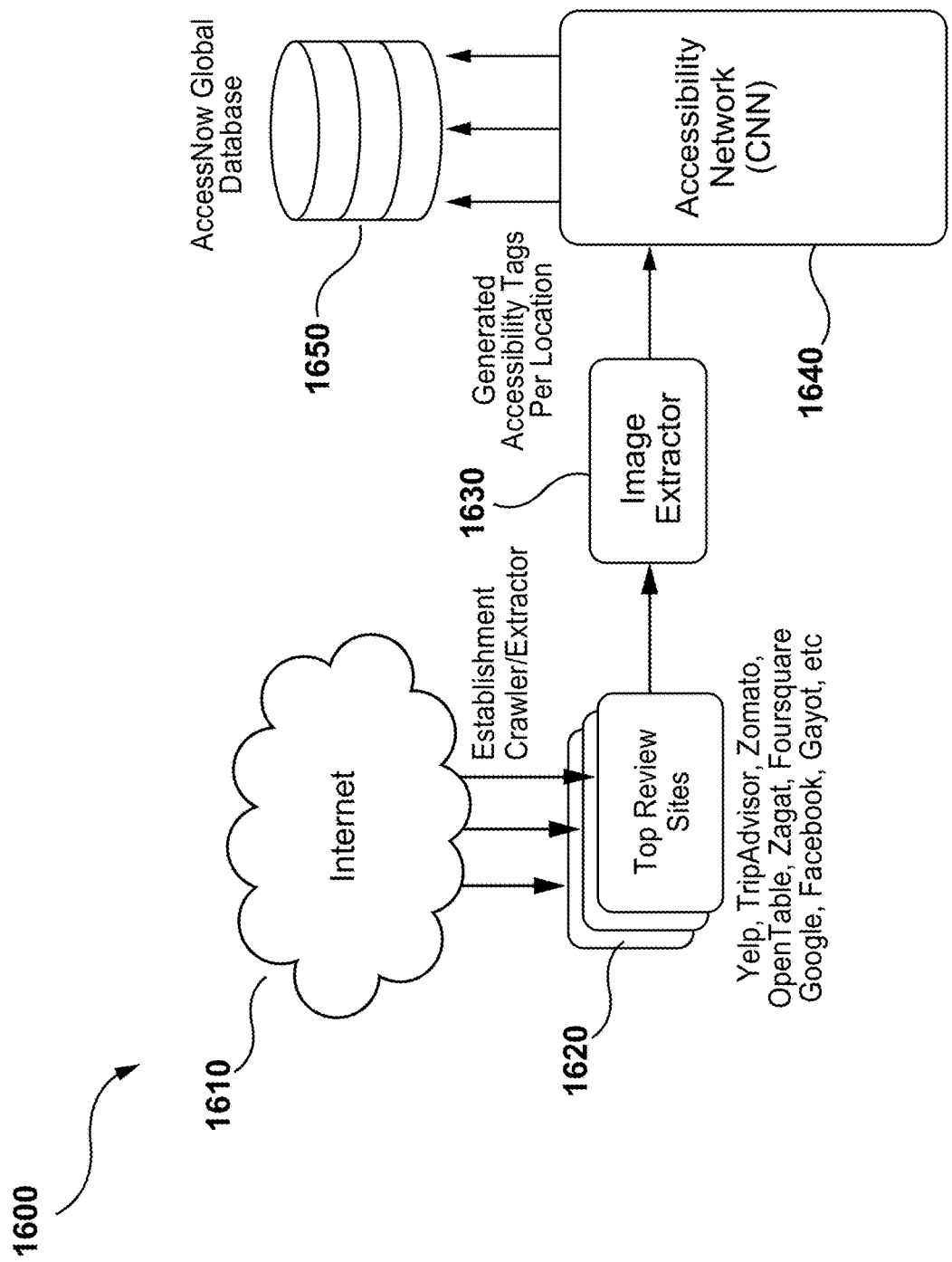
FIG. 16 shows a block diagram of an example embodiment of an architecture of the working environment of the system of FIG. 1.

An example architecture 1600 for the system 100 showing how it interacts with external data sources is illustrated in FIG. 16. The Internet 1610 provides the source data for an establishment crawler/extractor. Top review sites 1620 (e.g., Yelp, TripAdvisor, Zomato, OpenTable, Zagat, Foursquare, Google, Facebook, Gayot) process the data extracted from the Internet 1610. An image extractor 1630 processes the output from the top review sites 1620. An accessibility network 1640 (e.g., a CNN) receives image data as input from the image extractor 1630. The accessibility network 1640 generates accessibility tags per location and outputs the accessibility tags to a database 1650 for the system 100 (e.g., AccessNow global database).

A similar architecture as described above may be used for trails, whose data sources may be provided by live videos and collected sensor streams. The sensor streams can be collected from devices operated by people (e.g., volunteers, employees) or from devices unattended by people (e.g., drones, robots). To detect obstacles and suitability of ground terrain and other features relevant to accessibility, the cognitive system may make use of LIDAR sensing.

Figure 17:
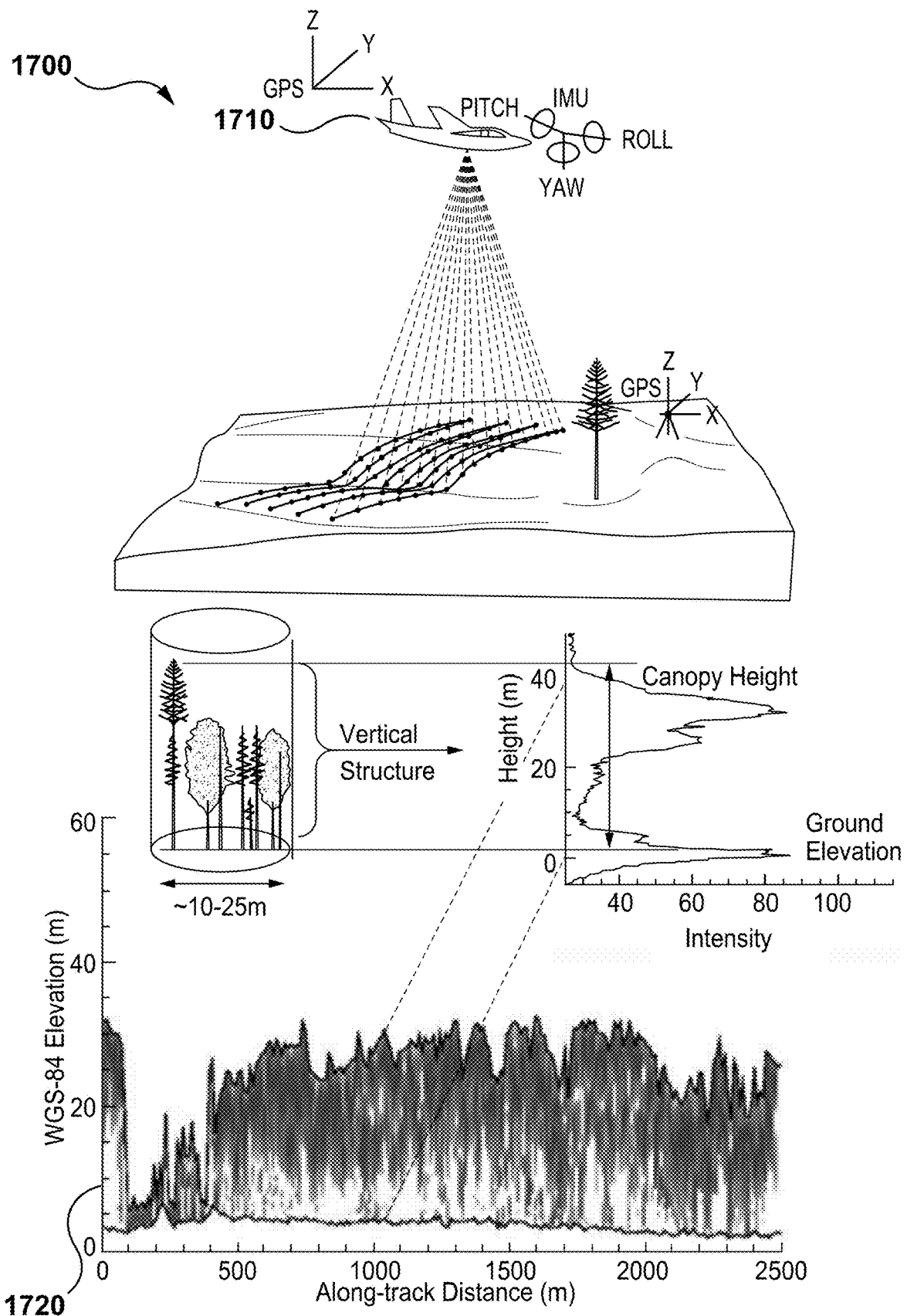
FIG. 17 shows an illustration and graph of an example sequence of overhead measurements for use by the system of FIG. 1.

Referring to FIG. 17, shown therein is an illustration and graph of an example sequence of overhead measurements for use by the system 100. A relevant analysis system to leverage consists of those used in fields such as forestry, where a mobile sensor 1710 whether mounted by drone, car, other robotic apparatus, or hand-held) is able to provide terrain elevation maps 1720. By adapting this technology to tracking more minute changes in elevation, outdoor areas can be considered for accessibility. For example, more features causing elevation deltas on the ground (such as from rocks, ditches, etc.) may provide relevant information on how easy it might be to traverse a path.

Figure 18:
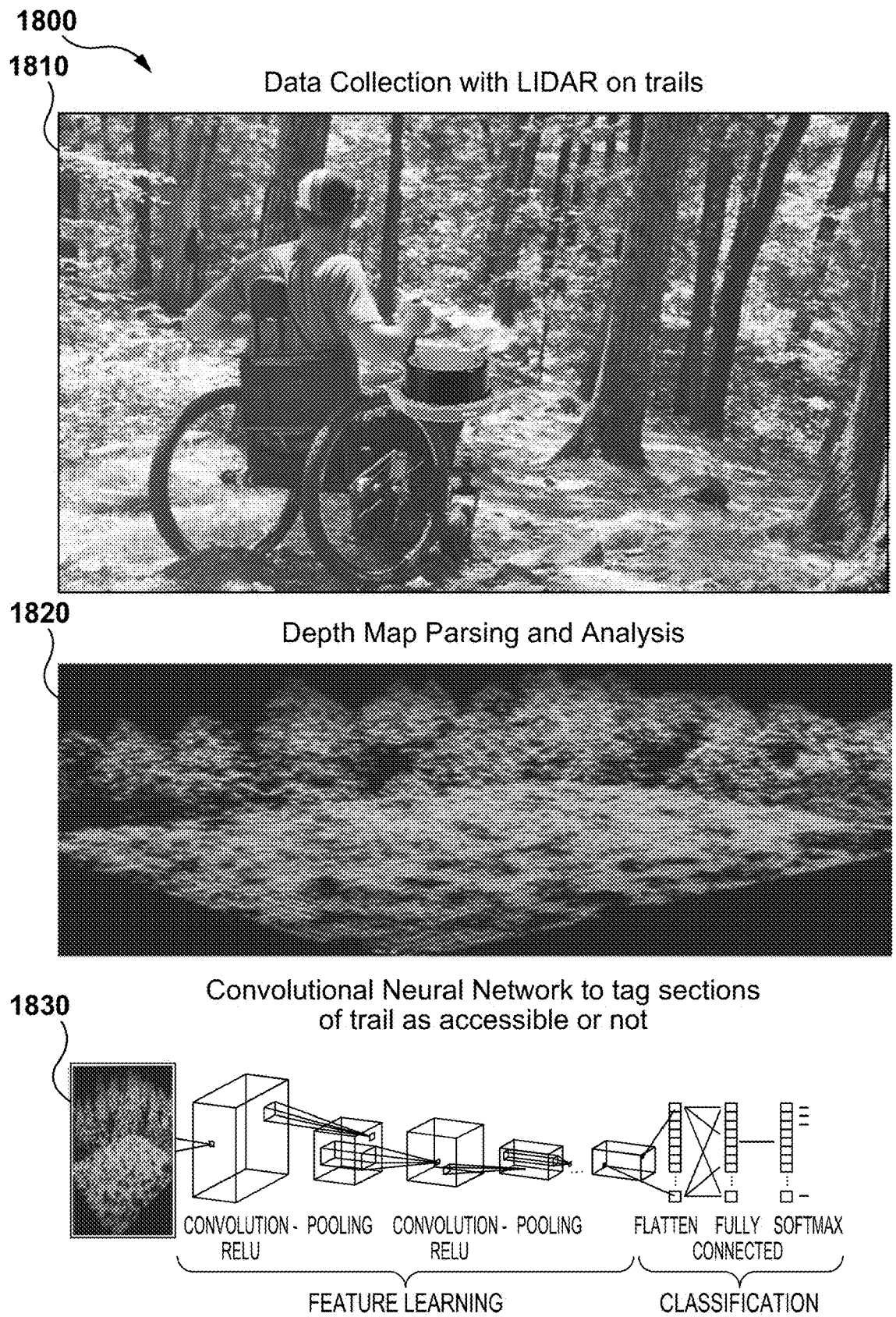
FIG. 18 shows an example of a sequence of LiDAR data collection and analysis of the data collected for use by the system of FIG. 1.

Referring to FIG. 18, shown therein is an example of a sequence of LiDAR data collection and analysis 1800 of the data collected for use by the system 100. The system 100 can utilize a streamlined workflow to collect LIDAR data on trails 1810, via wheelchair-mounted and/or hand-held and/or backpack-mounted sensors used by 'mappers' (i.e., workers manually collecting information along trails). The mappers can simultaneously mark down which parts of the trails are accessible or not 1820. The cognitive system can then utilize this data, consisting of LIDAR data and/or accessibility ratings and learn to capture the human intuition and experience of which parts of a trail are accessible 1830.

Figure 19:
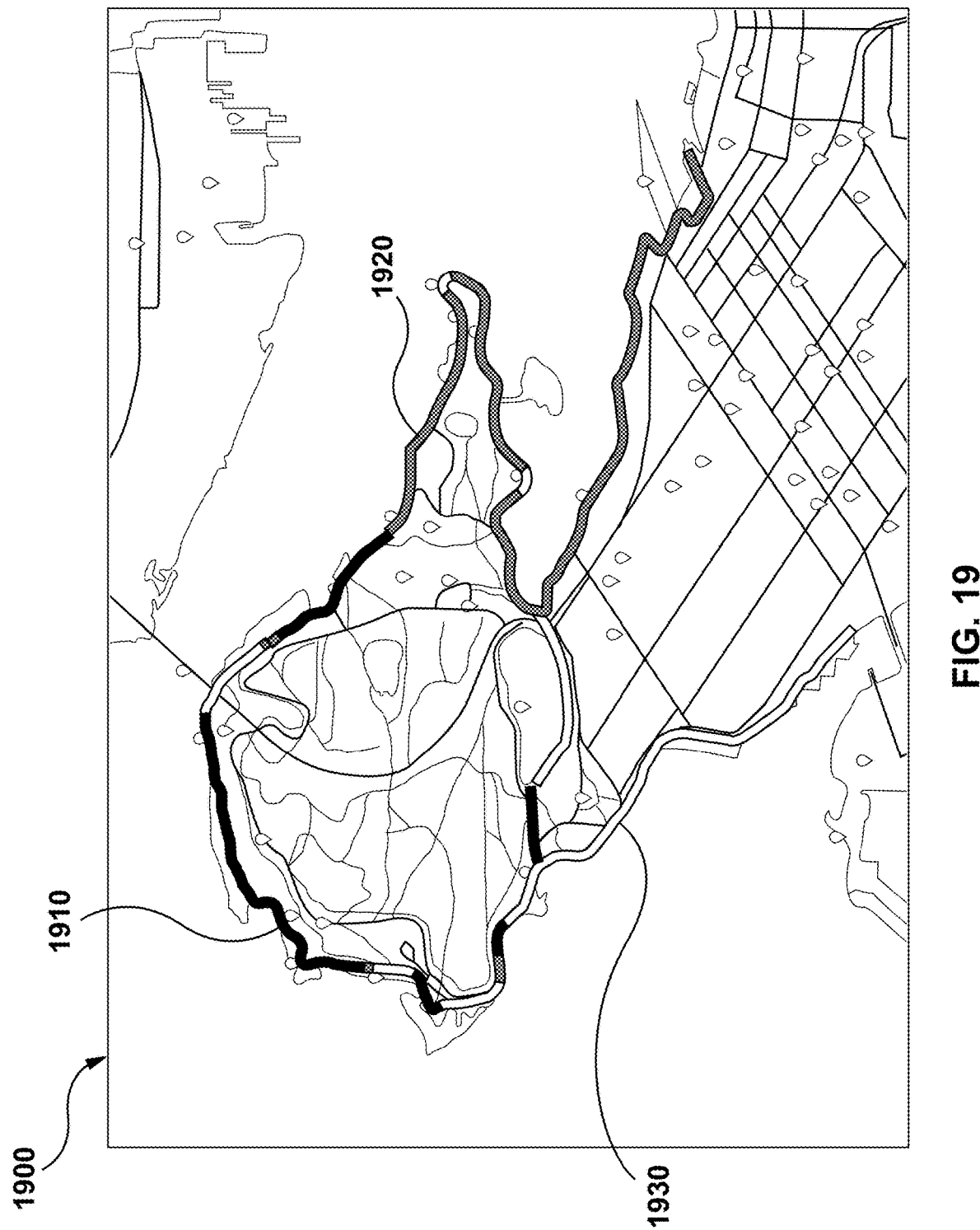
FIG. 19 shows an illustration of an example trail map produced by the LiDAR collection of FIG. 18.

The end result may be a trail map 1900, as illustrated in FIG. 19, with specific sections highlighted 1910, 1920, 1930 as being accessible or not. While a mapper is collecting data with LIDAR, the mapper's device may be synced to specific GPS locations as they traverse a trail.

Figure 20:
FIG. 20 shows example images produced by monocular depth estimation for use by the system of FIG. 1.

Referring to FIG. 20, shown therein example images 2000 produced by monocular depth estimation for use by the system 100. Another technology visual sensing element that can be used is monocular depth estimation. Machine learning models can provide relatively accurate depth estimates for a wide variety of indoor and outdoor environments. This is used, similar to LIDAR, in the data collection process and may be pipelined into a CNN to determine indoor accessibility for mobility concerns, such as wheelchairs. This helps in determining, for example, if passageways in a store are wide enough for a user in a wheelchair or crutches. Using SOTA monocular depth estimation software, the locations 2010, 2020, 2030, 2040 in FIG. 20 were photographed with typical smartphone cameras, and then analyzed for relative depths.

Through physical experimentation, color markers of generated depth maps may be correlated with physical distances (e.g., brighter colors are closer). For example, a specific value of a "bright orange" may be 0.2 meters, while "dark purple" may correspond to 3.4 meters. From this, obstacles and path widths can be inferred, and general rulings can be made based on common dimensions of wheelchairs, accessible door entrances, etc.

Using information from depth sensors combined with trigonometry based on the image sensor's field of view, the system 100 can determine physical width distances in images 2015, 1025, 2035, 2045. The system 100 can use these values to determine the accessibility of an area (e.g., an indoor store space) based on widths needed for wheelchairs and other persons with disabilities.

Figure 21:
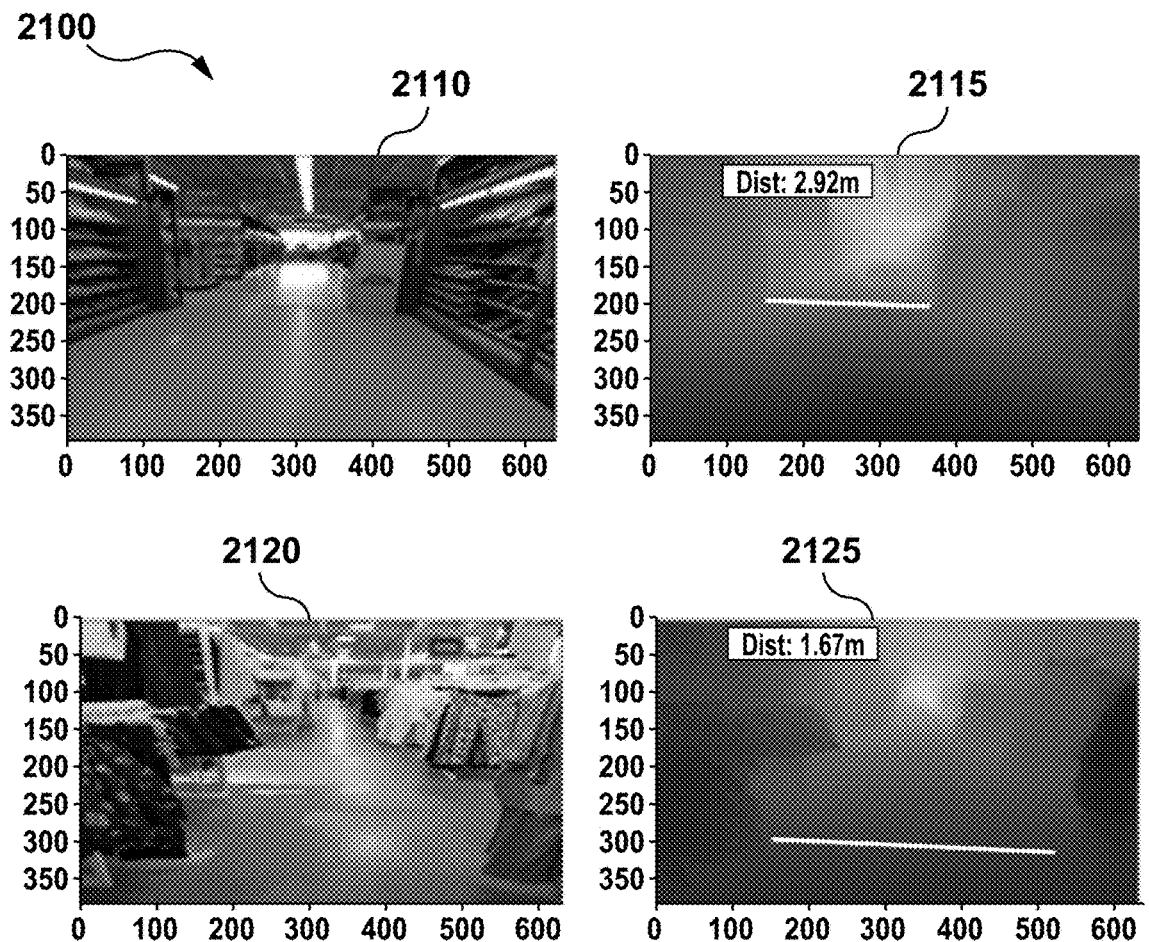
FIG. 21 shows example images produced by depth sensors for use by the system of FIG. 1.
Figure 22:
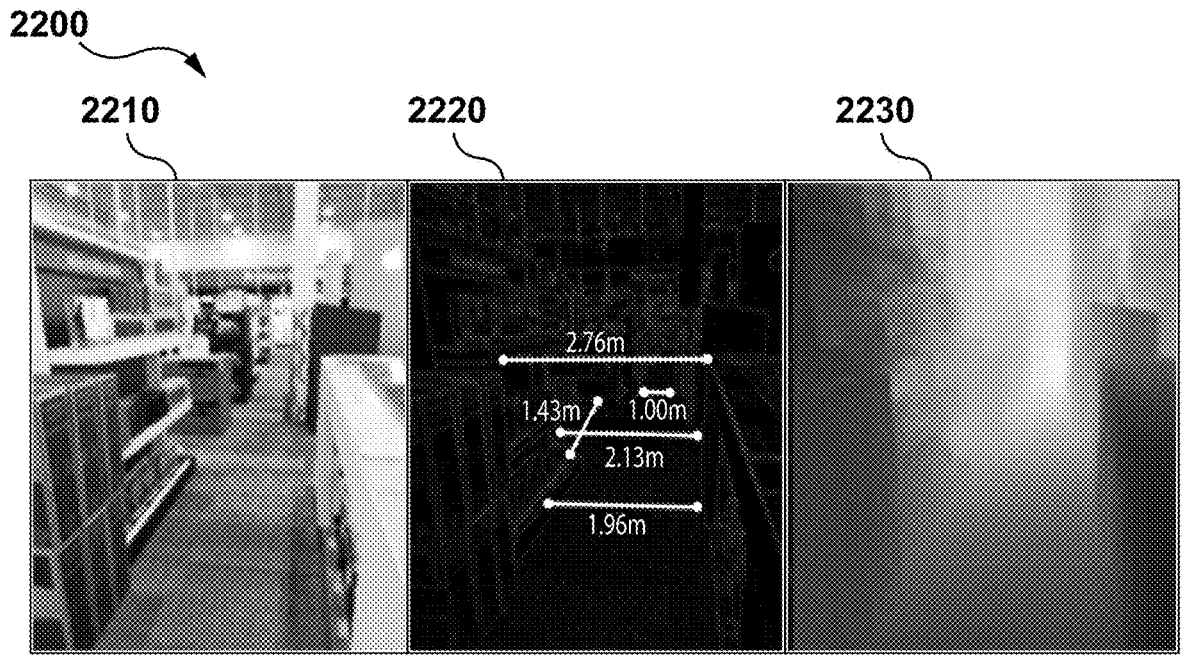
FIG. 22 shows example images of depth sensing with edge detection for use by the system of FIG. 1.

Referring to FIG. 21, shown therein are example images 2100 produced by depth sensors for use by the system 100. Referring to FIG. 22, shown therein are example images 2200 of depth sensing with edge detection for use by the system 100. In the images 2100 from FIG. 21, the depth sensing information can instantly give a hallway width, or width between items/racks/objects composing a lane in which customers will travel. Extending this, the system 100 detects lanes by using edge segmentation on the raw images 2110, 2120, and connects horizontal lines between various edges, to automatically find "indoor lanes" through which customers may move (images 2115, 2125). Given enough or a lack of width, a store, or areas of a store, may be deemed as accessible or not. In images 2200 from FIG. 22, this concept is applied using a Canny Edge Detector on the depth image 2210, 2230, and several tangential lines are generated and measured between various edges 2220.

Figure 23:
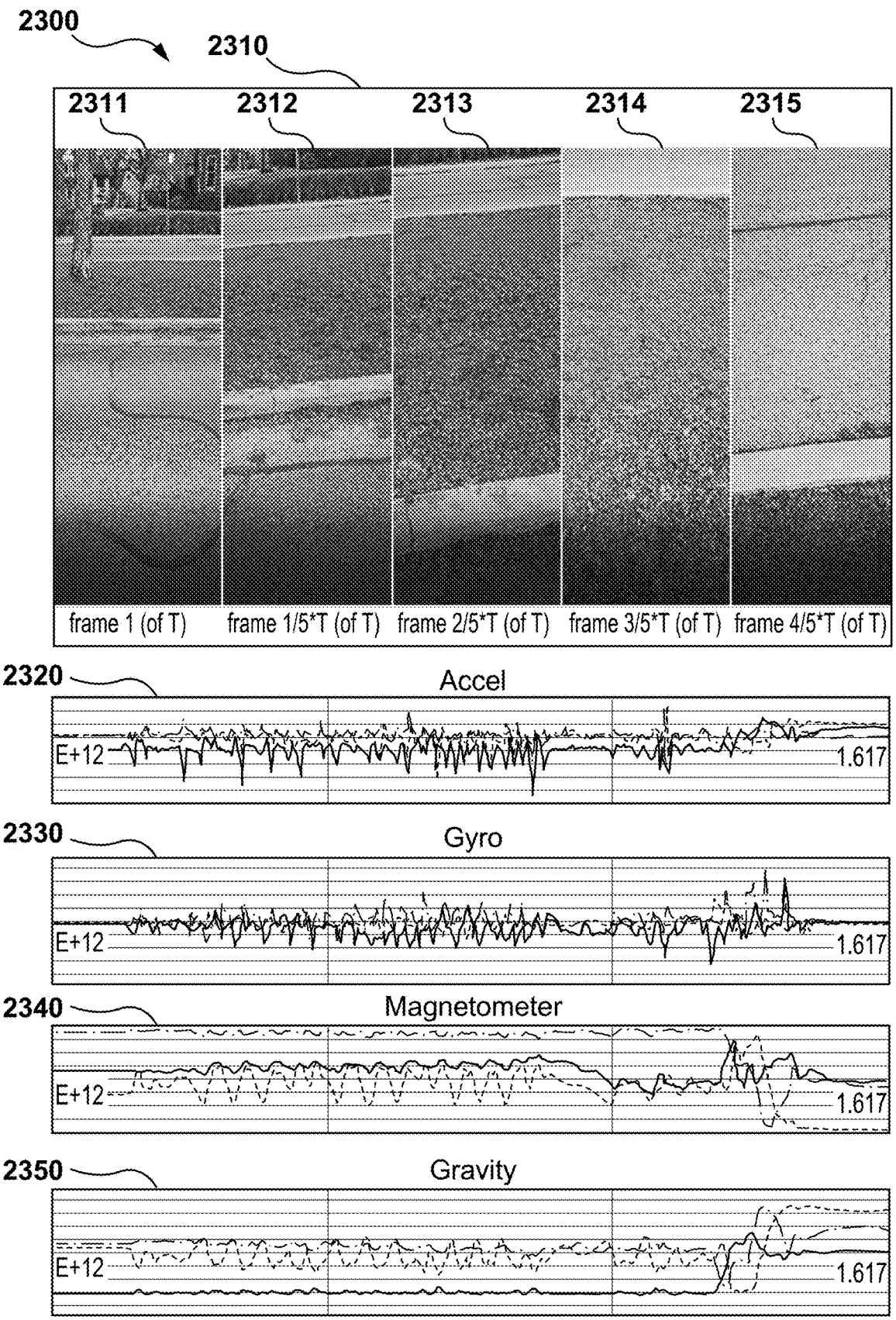
FIG. 23 shows example images and graphs representing the readings of the sensors used for vision and kinematic data fusion for use by the system of FIG. 1.

Referring to FIG. 23, shown therein is an example of the readings 2300 of the sensors used for vision and kinematic data fusion. The system 100 takes advantage of data fusion opportunities between multiple types of data, uniquely collected for the application. Mappers on trails and/or throughout cities have the ability to collect first-person visual information 2310 of the environment they traverse, simultaneously with the kinematics generated and saved on the phone.

The combination of this data allows for cross-feature learning as well as "data infill" for future experiments (e.g., through just a phone app) with limited sensing capabilities. For example, the ability to correlate visual video data (images 2311, 2312, 2313, 2314, 2315) to kinematic data (readings 2320, 2330, 2340, 2350) allows a neural network to learn that bumpy visual movement (e.g., moving over terrain) corresponds to a set of accelerometer, gyroscope, and other sensor values. Therefore, it can be learned which sensor values correspond to which type of obstacles, which allows the system 100 to accurately classify trails, city streets, etc., for accessibility.

In FIG. 23, two exemplary types of data are visual data recorded on a smartphone (images 2311, 2312, 1313, 2314, 1315) (interchangeable with any RGB video camera recorder) and the kinematics data (readings 2320, 2330, 2340, 2350) recorded on (a different, e.g., pocket-bound) smartphone. By synchronizing, subsampling frames, and taking a look at both data in context, a special-purpose algorithm may determine a correlation between a step, walking over rougher terrain, and stepping downwards, with the kinematic data. Particularly patterned spikes may be observed in all sensors stepping down for instance, while rougher terrain has a more distinct accelerometer and gyroscope signature. Through repeated experiments and collected data, the learning system learns to correlate and tell apart the actions and scenarios pertaining to accessibility, from the phenomena.

Kinematics covers a wide variety of sensors that currently can be found on mobile devices, such as accelerometer, gyroscope, magnetometer, barometer, geolocation, electromagnetic—WiFi, pattern detection, and kinematic dimension reduction.

Accelerometers provide a reading of three-dimensional acceleration, for example, in m/sec^2. An example of accelerometer records is given in the Table 1:

TABLE 1

| Timestamp (unix) | Ax | Ay | Az |
|---|---|---|---|
| 1611008962663 | 0 | 0 | 0 |
| 1611008962768 | 0.079083 | 0.089846 | −0.11898 |
| 1611008962871 | 0.186056 | 0.145407 | 0.11635 |
| 1611008962972 | 0.048106 | 0.071579 | 0.05865 |
| 1611008963073 | 0.17344 | 0.117292 | 0.028504 |
| 1611008963174 | 0.21547 | 0.480313 | −0.16771 |
| 1611008963276 | 0.851067 | 0.612107 | 0.109563 |

Gyroscopes provide orientation details in three dimensions, as a combination of direction (up/down and left/right), rotation, and tilt. An example of gyroscope records is given in Table 2.

TABLE 2

| Timestamp (unix) | Gx | Gy | Gz |
|---|---|---|---|
| 1611008962725 | −0.18858 | 0.122844 | −0.00435 |
| 1611008962834 | −0.02216 | 0.016408 | 0.004723 |
| 1611008962942 | −0.02781 | 0.019404 | −0.00072 |
| 1611008963049 | 0.004686 | 0.060506 | 0.005189 |
| 1611008963155 | 0.128314 | 0.031039 | −0.10855 |
| 1611008963262 | 0.283764 | 0.047038 | −0.5077 |
| 1611008963368 | 0.305406 | 0.032203 | −0.49025 |

Magnetometers provide three-dimensional measurements of the magnetic field. An example of magnetometer records is given in Table 3:

TABLE 3

| Timestamp (unix) | Mx | My | Mz |
|---|---|---|---|
| 1611008962730 | −14.4121 | 18.22696 | −98.7242 |
| 1611008962830 | −14.4135 | 17.93338 | −98.7253 |
| 1611008963010 | −13.9054 | 17.73483 | −99.1174 |
| 1611008963110 | −13.6861 | 17.749 | −99.2112 |
| 1611008963210 | −13.5625 | 17.60281 | −99.4209 |
| 1611008963409 | −13.4757 | 16.8539 | −99.6167 |
| 1611008963590 | −13.1504 | 15.81285 | −99.9169 |

Absolute orientation can be represented by roll, yaw, and pitch angles. Absolute orientation can be calculated by fusing data from the accelerometer, gyroscope, and magnetometer.

Barometers provide measurements of atmospheric pressure. An example of barometer records is given in Table 4.

TABLE 4

| timestamp (unix) | pressure (bar) |
|---|---|
| 1611008962729 | 993.1292 |
| 1611008962929 | 993.1777 |
| 1611008963029 | 993.1387 |
| 1611008963229 | 993.1682 |
| 1611008963329 | 993.1821 |
| 1611008963529 | 993.1182 |
| 1611008963729 | 993.073 |

An example of geolocation records is given in Table 5:

TABLE 5

| timestamp | latitude | longitude | altitude | accuracy | heading | speed |
|---|---|---|---|---|---|---|
| 1611008964447 | 43.68458 | −79.417 | 149.67 | 3.96 | 0 | 0 |
| 1611008966000 | 43.68458 | −79.417 | 146.37 | 3.79 | 0 | 0 |
| 1611008967000 | 43.68458 | −79.417 | 143.13 | 4.53 | 0 | 0 |
| 1611008968000 | 43.68457 | −79.417 | 142.36 | 4.09 | 0 | 0 |
| 1611008972000 | 43.68458 | −79.417 | 135.35 | 3.84 | 74 | 0.37 |
| 1611008973000 | 43.68458 | −79.417 | 134.00 | 3.79 | 192 | 0.97 |
| 1611008974000 | 43.68457 | −79.417 | 133.52 | 3.79 | 99 | 0.9 |

An example of collected WiFi records is given in Table 6. Table 6 shows measurements that were all taken at one timestamp (e.g., one electromagnetic scan). The system 100 may use the SSID information as a source of information for accurate identification of addresses.

TABLE 6

| timestamp | SSID | BSSID | frequency | Signal level |
|---|---|---|---|---|
| 1611008982727 | BELL606 | a0:1b:29:fa:31:66 | 2462 | −87 |
| 1611008982727 | SMCS | 18:64:72:3b:46:32 | 5745 | −88 |
| 1611008982727 | Kabootar | 40:c7:29:ed:87:ae | 2437 | −88 |
| 1611008982727 | BELL819-V | 46:e9:dd:4b:80:b6 | 2437 | −89 |
| 1611008982727 | ORBI89 | 0e:02:8e:95:cb:74 | 2427 | −89 |
| 1611008982727 | BELL178 | 54:64:d9:2e:98:84 | 2462 | −90 |
| 1611008982727 | SMCSPrinter | 18:64:72:3b:a1:c4 | 2412 | −90 |
| 1611008982727 | cincinatus | a4:56:cc:72:03:9e | 5785 | −91 |
| 1611008982727 | SMCS-Visitor | 9c:8c:d8:2b:b7:e1 | 2462 | −91 |

Figure 24:
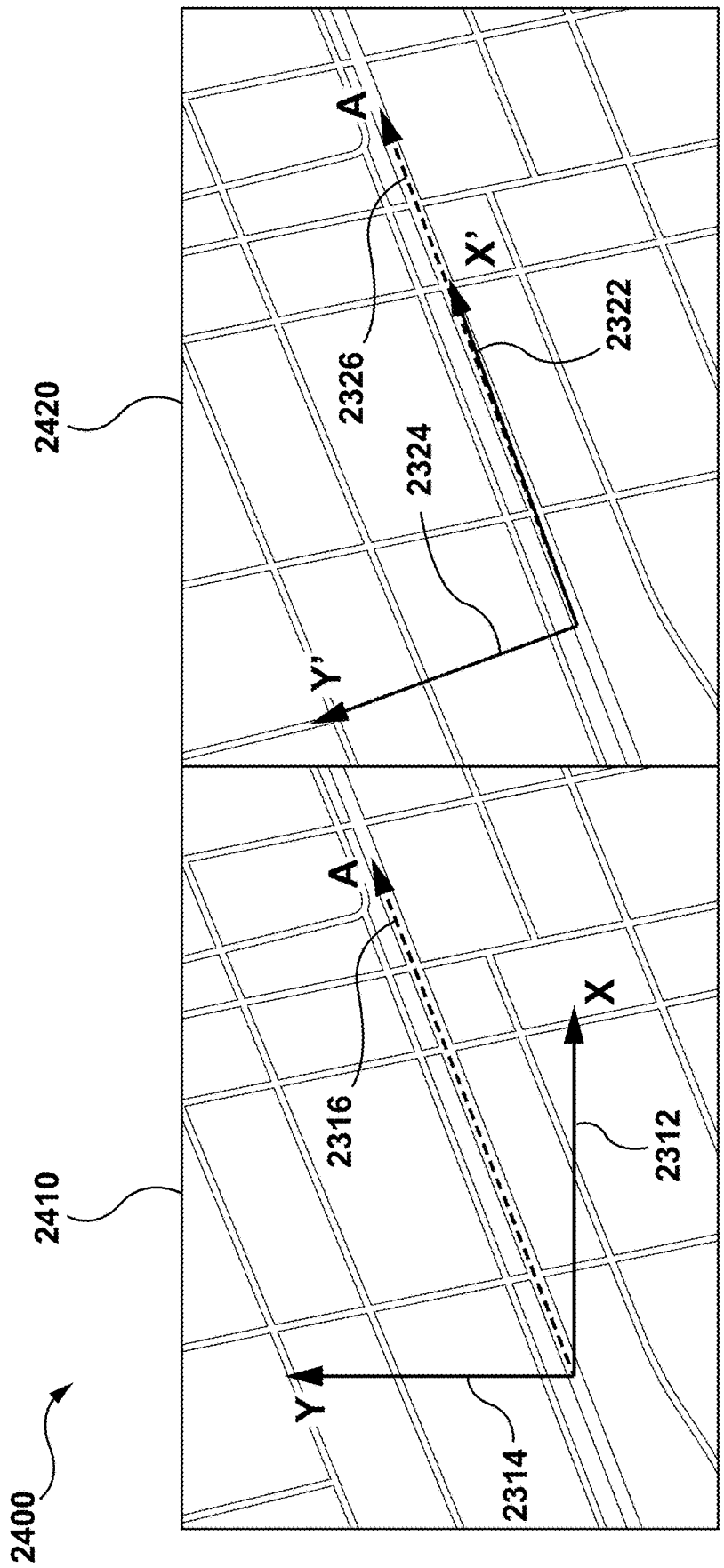
FIG. 24 shows an example of an image undergoing kinematic dimension reduction for use by the system of FIG. 1.

Referring to FIG. 24, shown therein is an example 2400 of an image 2410 undergoing kinematic dimension reduction 2420. The kinematic data is provided by four sensors. Three of them are three-dimensional and one is one-dimensional. That sums up to ten-dimensional data. The movement of the mapper is two-dimensional, and in many cases can be reduced to one-dimensional with proper selection of the axes 2312, 2314 (i.e., projection). Appropriate rotation of the axes 2322, 2324, turns a 2D vector A 2316 into a 1D vector A 2326.

Figure 25:
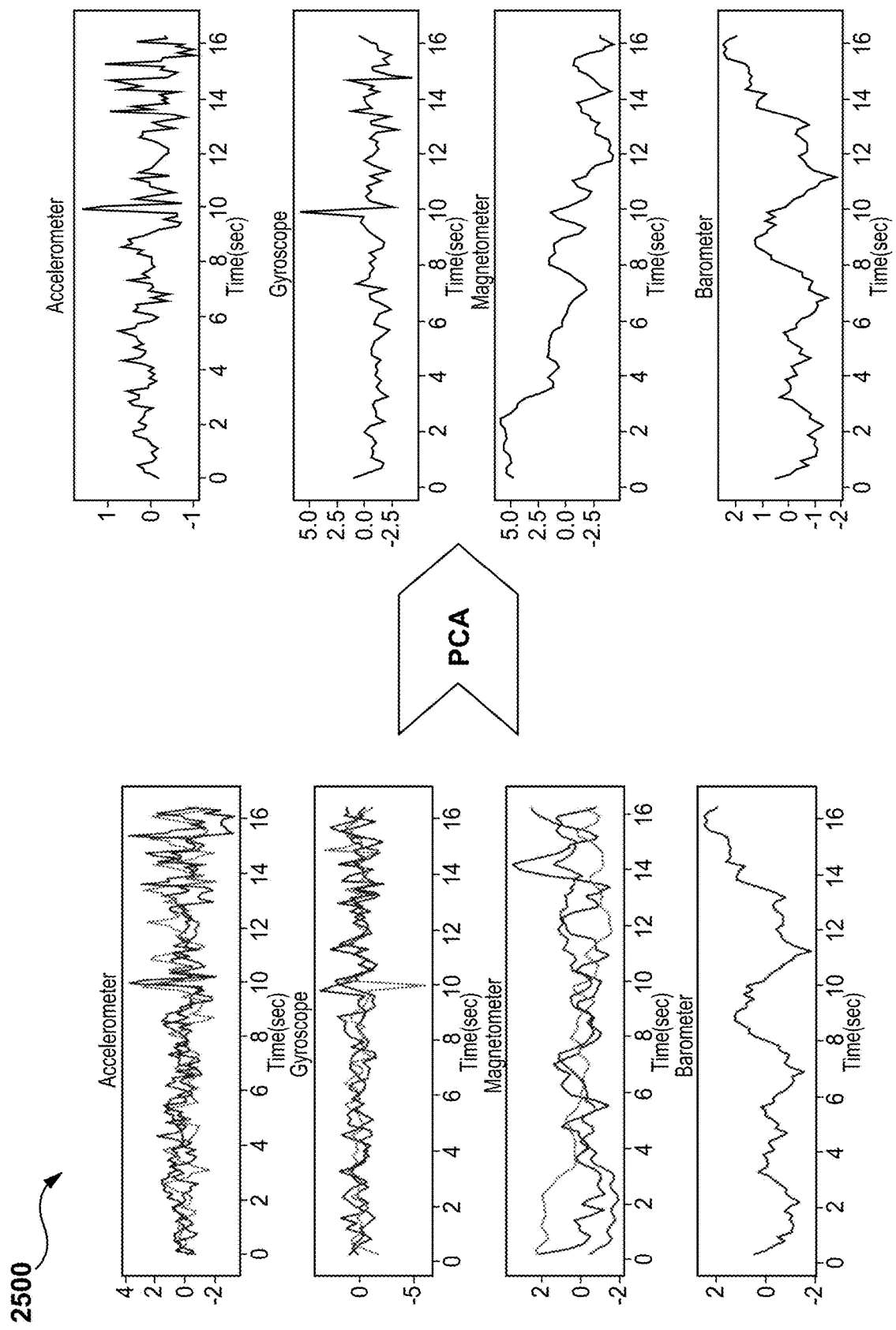
FIG. 25 shows example graphs illustrating dimension reduction performed by the system of FIG. 1.

In the application of system 100, the smartphone does not move in 10 dimensions; therefore, a reduction to 2D or 3D is a reasonable transformation. Nevertheless, in order not to suppress temporal phenomenon (e.g., for ramps), less strict compression is required. FIG. 25 shows a reduction from 10 dimensions to 4 dimensions 2500. In that dimension reduction, the temporal impulse, generated by climbing a step while recording, is conserved.

Hearing impaired listeners can usually achieve high speech intelligibility in quiet environments, but their speech understanding deteriorates in noisy backgrounds. For those hearing-impaired listeners, a noisy environment poses an inaccessible barrier that the system 100 detects and classifies.

Speech intelligibility in various types of noise is affected by three factors: (1) the existence of linguistic information; (2) the amount of noise at low frequency regions; and (3) the presence of amplitude fluctuations. The system 100 measures, classifies, and rates the noise level of a place, based on one or more of the following four criteria—signal level in decibels, amount of noise at low frequency regions, audio signal bandwidth, and presence of amplitude fluctuations.

The system 100 may also manage spectral noise. Most people with sensorineural hearing loss are associated with broader-than-normal auditory filters. The excitation pattern becomes "smeared" compared with normal hearing when the speech signal passes through the broader filters. To be specific, the difference between peaks and dips in the amplitude spectrum is reduced, resulting in a poor representation of some important perceptual cues.

The system 100 may also manage temporal envelope distortion. Since a listener with hearing loss will most likely have broadened auditory filters and may not accurately resolve spectral cues in speech, he/she will rely to a greater extent on temporal envelope cues to aid speech recognition. Therefore, such a listener is most likely to be affected by any distortions to the temporal envelope of speech. Distortion of temporal envelope cues can impair performance.

The system 100 may also manage fractal (pink) noise and broadband noise. Fractal noise is any noise with the spectral density S that depends on K, frequency f, and power parameter α, as follows:

$$S(f) = K \times \frac{1}{f^\alpha}$$

The pink noise is a good measure of the impact of the environment noise on speech eligibility. It captures the low frequencies component as well the spectral pattern of the human auditory system, which processes frequencies in a roughly logarithmic fashion. In pink noise, there is equal energy in all octaves (or similar log bundles) of frequency. The power parameter α determines the noise fall rate per octave (3 dB per octave for α=1). At high enough frequencies, pink noise becomes marginal in comparison to broadband white noise, and the equal energy per frequency interval becomes dominant. The system 100 captures the level of pink noise via two parameters: the fractal dimension calculated in the time domain, and the ratio between the spectral density of the low and the high frequency bands.

The system 100 may perform audio signal processing to address sound-related issues. Quantification of these parameters may be done by measuring the relative noise level in low frequencies. In order to capture the intricate details of the noise spectrum, the system 100 may measure various (e.g., one to four) parameters of the noise level recorded at the place of interest and performs regression analysis to determine the relative importance of each point.

The system 100 may then perform calibration. An accurate sound level measurement requires calibration of the measurement equipment. The system 100 may use a standard smartphones' microphone to measure that. In order to do that, several technical issues may be addressed:
  1) Disabling AGC— The sound level in a smartphone is processed via an Automatic Gain Control (AGC) which affects the recorded levels and the impulse response. This AGC mechanism is disabled via a dedicated API.
  2) Calibrating of the sound level using standard Sound Level Meters (SLM).

3) Compensating microphones' 3D directionality pattern—Smartphones apply phase processing to generate a directional sensitivity pattern to improve the clarity of the user voice transmission. This directionality pattern is measured and compensated via a dedicated workflow.

The system 100 may process noise attributes. The system 100 extracts the following parameters from audio recordings collected in the places to be rated. These recordings are tagged (rated) in the learning phase. FIG. 25 graphically depicts the parameters. A definition of the kth moment $m_k$, based on frequency f and function X, may be used for the following measures:

$$m_k = \int_{-\infty}^{\infty} f^k |X(f)|^2 df$$

The system 100 can measure the noise level, in dB, by a SLM calibrated smartphone. The system 100 may use the measured noise level to calibrate the spectral density. Once calibrated, the system 100 uses the following discrete formula to calculate NL:

$$NL = m_0 = \sqrt{\frac{1}{N}\sum_{k}^{N}|X_k|^2}$$

where N is the number of samples, k is the frequency index of sample, and X is the discrete Fourier transform, which is given by:

$$X[k] = \sum_{n=0}^{N-1} x[n] e^{\frac{-j2\Pi kn}{N}}$$

where x[n] is the nth time domain sample.

Gabor bandwidth is defined as the normalized second moment of the frequency spectrum, which is given by the formula:

$$G = \sqrt{\frac{\int_{-\infty}^{\infty} f^2|X(f)|^2 df}{\int_{-\infty}^{\infty} |X(f)|^2 df}} = \sqrt{\frac{m_2}{m_0}}$$

where f is frequency and m0 and m2 are defined by the formula.

The fractal dimension is defined via the values of a, the frequency decay exponent. It is measured directly from the time domain signal using a box-counting fractal dimension estimation method.

To calculate a box-counting dimension, the frequency spectrum is split into boxes with side length of ε, and, for each box size, the number of boxes required to cover the spectrum envelope is counted. The fractal dimension Dbox is given by:

$$D_{box} = \lim_{\varepsilon \to 0} \frac{\log N}{\log(1/\varepsilon)}$$

where N is the number of the counted ε-side length boxes.

The system 100 may calculate a low-frequency (LF) spectral density ration. The LF spectral density ratio measures the relative content of the low frequencies. For a cutoff frequency of BW, it is defined as the log of the average spectral density of the frequency range 0-100 hz, divided by the average spectral density above 100 Hz. The log function is used here since the common decibel scale is logarithmic. The following formula can be used to calculate LF:

$$LF = \text{mean}(y(f<BW))/\text{mean}(y(f>BW))$$

where y is the frequency response amplitude and f is the frequency.

Figure 26:
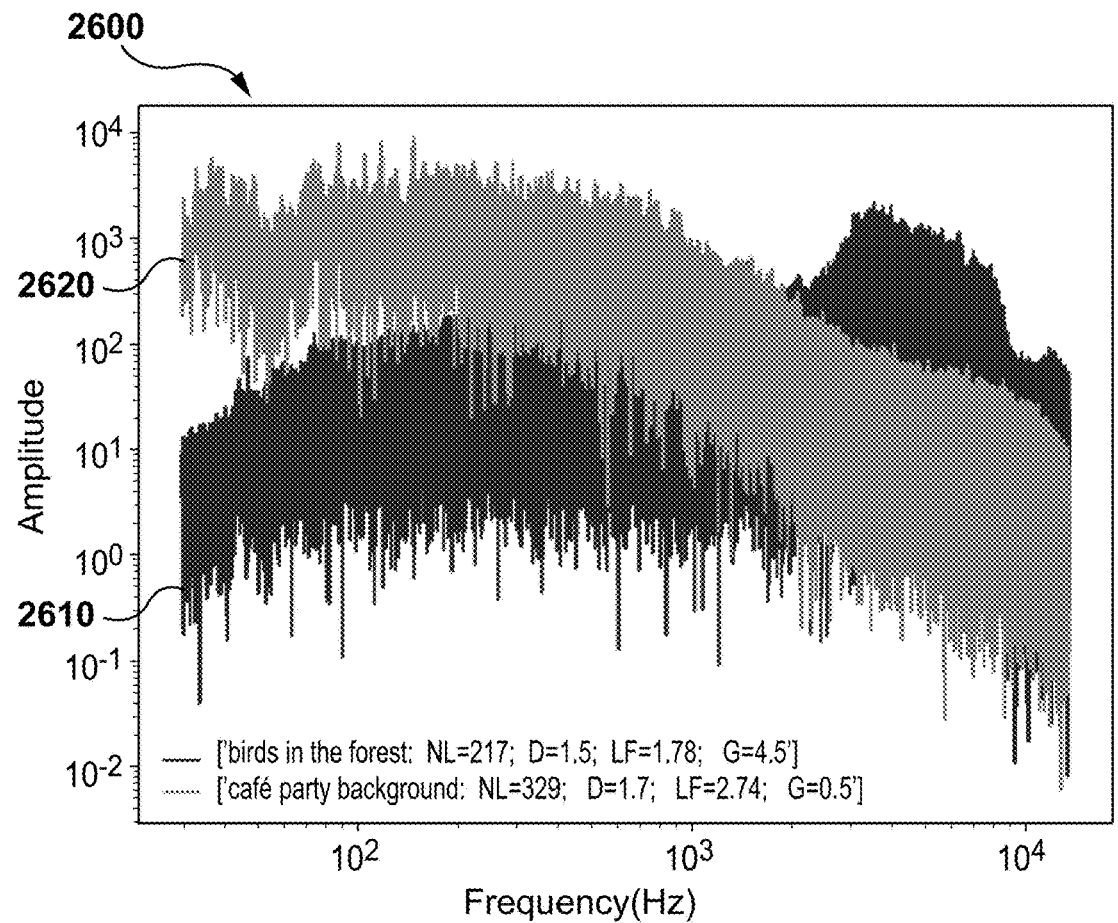
FIG. 26 shows an example graph of noise attributes measured by the system of FIG. 1.

FIG. 26 shows an example of noise attributes 2600 that the system 100 quantifies.

The noise attributes 2600 are calculated to two signals: a recording of birds 2610 in the forest and a recording of a cafe party 2620.

It can be seen from the FIG. 26 that the cafe party has a higher low frequency content with a steep descent with frequency (LF=2.74), while the birds in the forest have a negative value of low frequency content (LF=−1.78, the negative value comes from the log( ) operator). Similarly, the fractal dimension of the cafe party (D=1.7) is higher than the same parameter for the birds (D=1.5).

In this example, the spectral and temporal character of the cafe party noise is a much more hostile environment for people with hearing loss, the system 100 is able to use the noise attributes to quantify the spectral and temporal character.

Figure 27:
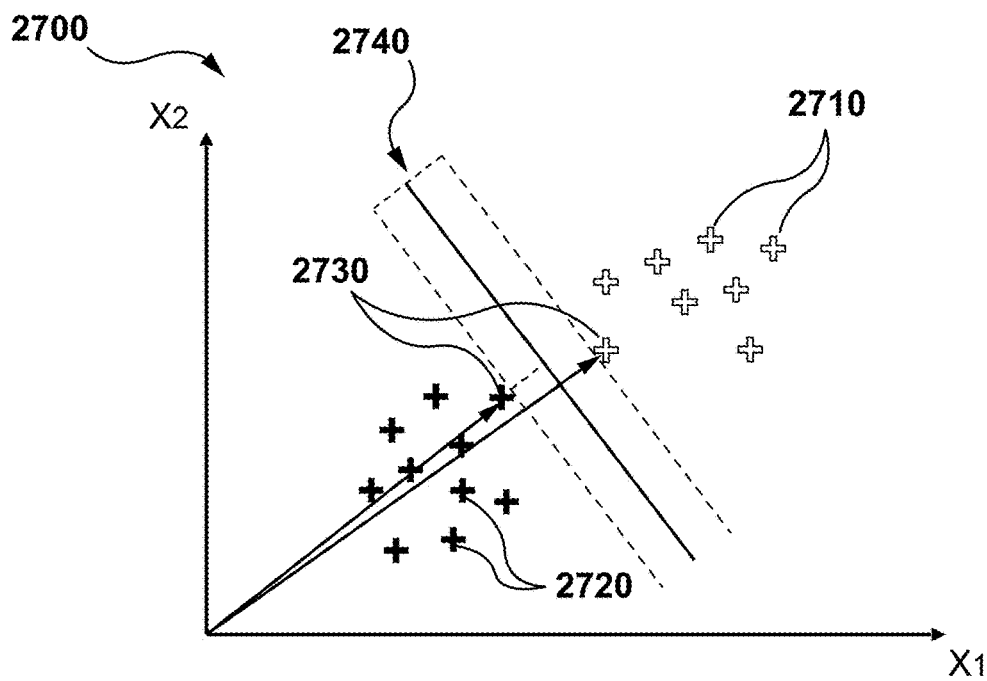
FIG. 27 shows an illustration of an example support vector machine classifier built by the system of FIG. 1.

FIG. 27 shows an example of how the system 100 goes through the learning process 2700, building a support vector machine (SVM) classifier.

The system 100 uses the tagged recordings to build a classifier that will use the data to construct a model. The SVM is a supervised machine learning algorithm capable of performing classification, regression, and even outlier detection. The learned model of the SVM is an equation that describes a hyperplane (with the dimension of the total number of metrics' dimensions) that separates the data points in a 4-dimensional space while maintaining the maximum distance to the closest point in each set. FIG. 27 depicts a simplified two-dimensional example of two sets, grey 2710 and black 2720. The support vectors 2730 are the closest points in the two sets, and the hyperplane 2740 (a line in this example) is calculated to be the one with maximum distance between the two groups.

The following provides an example of the learning process 2700. To begin, 41 sound records of a variety of sources and environments were recorded, 30 out of them were tagged as noisy (1) or quiet (0) and used for a training process, and 11 were used as the test group.

Table 7 provides an example list of the noisy records, with their respected 4 calculated metrics.

TABLE 7

| Name | NL | D | LF | G |
| --- | --- | --- | --- | --- |
| busy-road-street-noises | 470.6 | 1.79 | 2.1 | 921.86 |
| cafe-party-background-sound | 328.5 | 1.75 | 2.74 | 533.74 |
| church-bell-bells-ringing-at | 776.99 | 1.85 | 0.64 | 609.09 |
| construction-vibratory | 471.45 | 1.87 | 2.29 | 617.61 |
| diesel-engine-2-8-liters | 772.2 | 1.96 | 3.45 | 171.31 |
| dishwasher-single-in | 312.39 | 1.7 | 1.76 | 821.38 |
| engine-noise-aircraft-in | 434.27 | 1.89 | −0.23 | 2689.89 |
| helicopter-approaching-loud | 275.2 | 1.63 | 3.42 | 701.58 |
| helicopter-in-limbo-about-50 | 609.76 | 1.87 | 1.67 | 865.99 |
| ice-2-is-leaving-the-station | 484.15 | 1.83 | 3.02 | 646.59 |
| loud-snoring-sleep-apnea | 245.53 | 1.58 | 2.09 | 2017.72 |
| maserati-quattroporte | 293.55 | 1.82 | 2.87 | 1449.43 |
| outdoor-dining-many | 160.08 | 1.82 | 1.84 | 929.67 |
| outdoor-restaurants-many | 145.28 | 1.72 | 2.25 | 967.18 |

TABLE 7-continued

| Name | NL | D | LF | G |
|---|---|---|---|---|
| restaurants-bar-pub-the | 187.33 | 1.71 | 1.27 | 1407.08 |
| storm-wind-howling-pitch | 244.71 | 1.83 | 2.45 | 297.17 |
| summer-thunderstorms | 131.91 | 1.36 | 1.89 | 1144.08 |
| washing-machine-spin-fully | 1089.52 | 1.88 | 0.69 | 795.33 |

Table 8 provides an example list of the quiet recordings.

TABLE 8

| Name | NL | D | LF | G |
|---|---|---|---|---|
| bath-water-enter-leave | 92.15 | 1.56 | 0.16 | 5834.68 |
| birds-in-the-forest-with-a | 216.99 | 1.51 | −1.78 | 4498.4 |
| crows-and-magpies-in-the | 123.04 | 1.55 | −1.72 | 1749.65 |
| hailstorm-in-summer-the | 170.69 | 1.47 | 1.61 | 1864.74 |
| hairdryer-with-two-stages | 250.22 | 1.78 | 1.21 | 3907.2 |
| humming-of-a-beehive-swarm | 361.13 | 1.77 | 2.92 | 1515.33 |
| rain-on-a-roof-window-plus | 354.07 | 1.73 | 2.51 | 748.27 |
| sewing-machine-with | 320.93 | 1.79 | 0.64 | 1672.92 |
| shower-in-filled-bathtub | 230.83 | 1.8 | −1.5 | 4602.74 |
| small-grain-mill-coffee | 126.04 | 1.58 | −2.46 | 1761.3 |
| small-quiet-waves-rippling | 29.87 | 1.38 | 0.99 | 2467.23 |
| small-river-stream-with | 194.01 | 1.55 | 0.09 | 2894.27 |
| bath-water-enter-leave | 92.15 | 1.56 | 0.16 | 5834.68 |

The definition of a noisy environment is based on the aggregation of the four sound images defined here, and not the common concept of noise as just the noise level.

The SVM module of the Scikit-learn package was used in Python code to implement the SVM learning on the tagged data and apply the resulting model over the test data. Table 9 provides an example of the results of the tagging.

TABLE 9

| Name | NL | D | LF | G | Noisy? |
|---|---|---|---|---|---|
| summer-storm-with-rain-about | 257.84 | 1.57 | 4.03 | 282.39 | N |
| baby-cries-a-little-infant | 234.45 | 1.73 | −1.43 | 3053 | N |
| big-fireworks | 374.72 | 1.61 | 1.25 | 1062.96 | Y |
| icy-wind-storm-high-winds | 222.82 | 1.84 | 1.08 | 1410.57 | Y |
| lively-pedestrian-mall | 240.78 | 1.69 | 3.02 | 1069.83 | Y |
| loud-dishwasher-industrial | 408.3 | 1.87 | 2.22 | 954.41 | Y |
| machine-noise-turbine | 404.89 | 1.9 | −0.21 | 1234.62 | Y |
| party-buffet-cafe-bar | 160.51 | 1.49 | 1.21 | 1130.17 | Y |
| strong-wind-rustles | 667.13 | 1.82 | 1.47 | 3091.82 | N |
| washing-machine-water-pump | 240.19 | 1.78 | 1.08 | 818.07 | Y |
| waterfall-strong-noise | 762.1 | 1.86 | 0.72 | 2404.54 | N |

The system 100 may classify unrated environments. The system 100 uses Text Analytics and Natural Language Processing (NLP) to extract accessibility related keywords and determine positive or negative sentiment of users' accessibility reviews of locations, typed or spoken. Data sources can include tagged data and non-tagged data. Tagged data includes crowdsourced information collected by a dedicated application and information collected by field surveys. Non-tagged data includes online open-source reviews, Geo Data suppliers, dedicated web services (restaurants and hotels booking, tourism applications, etc.), and RSS feeds.

The analysis process captures the relevant keywords (e.g., wheelchair, noise, etc.) and analyzes the sentiment to determine the context (e.g., accessible for wheelchair users or not)

The system 100 may provide an extracted information rating. Once information collected from a place is analyzed, the system 100 may distinguish between three levels of information items extracted from the text: classes, tags, and keywords.

Classes—The system 100 may divide extracted information from the text into classes in order to reflect the diversity of the accessibility term. For example, such classes may include: "Motion", "Vision", "Sound", "Sensory", and an integrated class denoted as "General".

Tags—When accessibility information is clear and unambiguous, the system 100 may mark the whole data collected (across all senses) as tagged and use it for supervised learning. For example, once found in a text, the combination of: "no(t)", "accessible" and "wheelchair", the system 100 tags the place as inaccessible.

Keywords—Keywords are tokens that can be used to assess accessibility. Some examples of keywords include: stairs, noisy, loud, dimmed, spacious, sign language. The system 100 may calculate for each such word a score and use that as an input to a neural network based ML. The system 100 may divide keywords into two groups: Ap—Accessibility Positive (e.g., "automatic doors", "quiet") and An—Accessibility Negative (e.g., "loud", "step").

Sentiment—Since the accessibility information is very specific, there is a minor linguistic difference between "access" and "no access". Therefore, one solution can be to deduce the sentiment of an item from the immediate vicinity of the keyword within the text.

The system 100 may calculate the score per each class using a weighted average of the keywords+sentiments, associated with that class, as they appear in the text. The system 100 may give special treatment to the tags that are detected in the text.

The system 100 may select keywords using pre-processing of tagged reviews. For each class of the Classes, the system 100 aggregates all the reviews according to their tagged rating. Since the word distribution has strong heteroscedasticity, the system 100 uses bootstrap statistics (and not t-test) to test hypotheses.

The system 100 may assign, per each class, weights using multivariate linear regression, performed on the tagged data.

Multidimensional scaling is an efficient nonlinear dimension reduction method that solves the problem of representing n objects geometrically by n points. The system 100 may apply this method to reduce the six dimensions to two dimensions and generate a conceptual map best in the distance between the keyword distributions.

Figure 28:
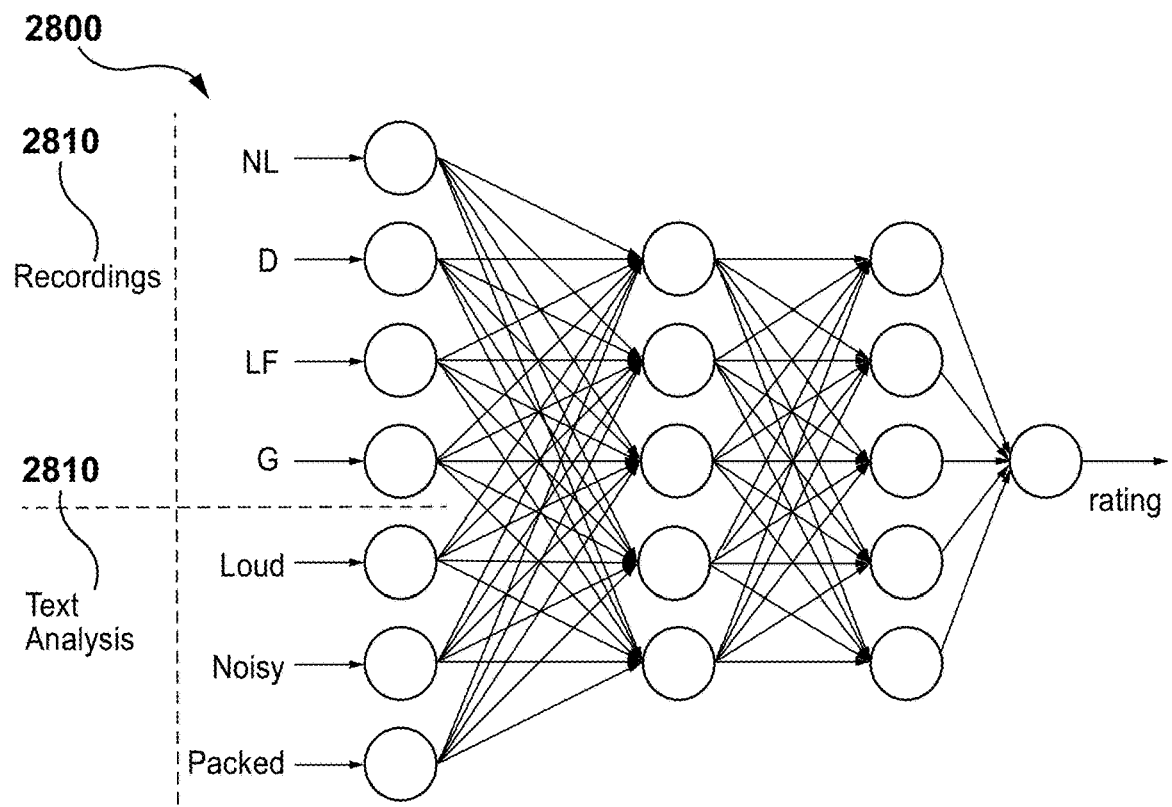
FIG. 28 shows a graph of an example of data fusion of text and sound performed by the system of FIG. 1.

FIG. 28 shows an example of data fusion 2800 of text 2820 and sound 2810. The system 100 may fuse the text and sound data using a backward propagation neural network.

Table 10 provides examples of keywords found in the text.

TABLE 10

| Text in the reviews | Associated to: |
|---|---|
| not accessible for wheelchair. | TAG |
| not accessible for wheelchair. Waiting time not a building without accessible access. The stair Down stairs and not accessible for wheelchair. Wa her they are a full accessible establishment. W Down stairs and not accessible for wheelchair. Wa a building without accessible access. The stair | Motion |
| d very clean. Down stairs and not accessible fo king down a flight of stairs into a long narrow ro ere is a steep set of stairs down to the restaurant an issue dealing with stairs. While in Toronto | Motion |

TABLE 10-continued

| Text in the reviews | Associated to: |
|---|---|
| his establishment has stairs descending, we ca n' ere was a line up the stairs and out the door. Ev le of feet before the stairs to descend to the res e to descend down the stairs to get to the restaur e restaurant. Down stairs and not accessible fo navigating the steep stairs. Place was pretty bu all tables, dark and noisy. I ordered salad whi crowded and somewhat noisy, but we persevered The place is pretty loud and overall not a grea R The place gets quite loud but families do come h | Noise |
| ance is good but too crowded. Slow service EOR W solutely overrated. Crowded, with an average se ng one side. It was crowded and somewhat noisy, another bar and more crowded tables, into a thir n bad lighting or if crowded that arrangement is | General, Sound, Sensory |

TABLE 10-continued

| Text in the reviews | Associated to: |
|---|---|
| e amazing, place was packed but staff were rude a table, the place was packed, and there was a lin | |

Table 11 provides an example of the weight and associated classes for each keyword. The system 100 may use this weight to average, per class, the appearance, per 1000 words of each keyword. The system 100 uses the weights optimized by the machine learning over the tagged data.

TABLE 11

| Keyword | Weight | Classes |
|---|---|---|
| wheelchair, access, no | −10 | TAG |
| wheelchair, access, no | −5 | Motion |
| wheelchair, no | −5 | Motion, General |
| access, no | −5 | Motion, General |
| access, without | −5 | Motion, General |
| stair | −1 | Motion, Senses, General |
| packed | −1 | Motion, Senses, General |
| crowded | −1 | Motion, Senses, General |
| Narrow | −1 | Motion, Senses, General |
| packed, no | 1 | Motion, Senses, General |
| crowded, no | 1 | Motion, Senses, General |
| Narrow, no | 1 | Motion, Senses, General |
| dark | −2 | Vision |

TABLE 11-continued

| Keyword | Weight | Classes |
|---|---|---|
| Elevator | 1 | General |
| spaciuse | 1 | General |
| accessible | 1 | General |
| Loud | 1 | General, Senses |
| Loud | −2 | Noise |

Figure 29:
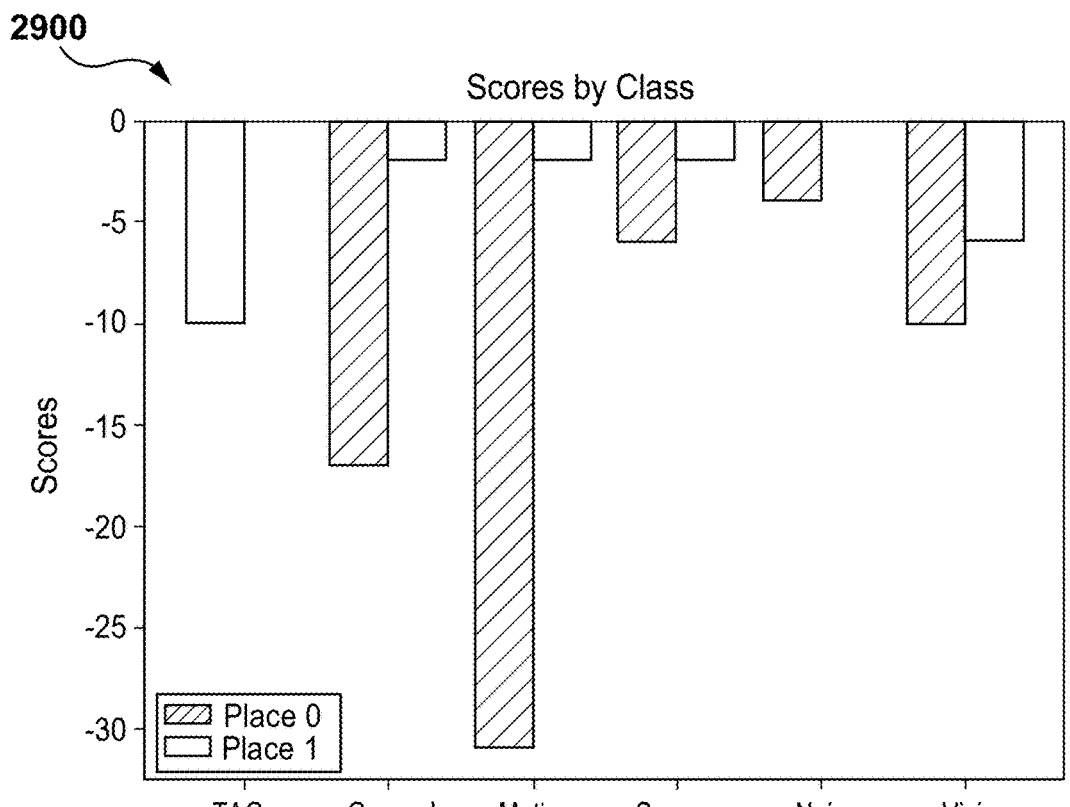
FIG. 29 shows a graph of an example of scores by class calculated by the system of FIG. 1.

FIG. 29 shows an example of scores by class 2900. The functionality of the system 100 can be demonstrated by comparing scores of reviews collected on a mobility inaccessible restaurant and a randomly selected restaurant, both in downtown Toronto. The reviews contain 3000 and 9000 words respectively.

Table 12 provides an example of multidimensional scaling. The system 100 selected seven restaurants in downtown Toronto. The system 100 collected reviews from a variety of sources. Table 12 shows the keywords and their distribution.

TABLE 12

| Word | Alo | Canoe | Firkin on Bloor | George Street Diner | GUSTO 101 | PAI_rev | Sabisaba |
|---|---|---|---|---|---|---|---|
| ['wheelchair', 'access', 'no'] | 0 | 0 | 0 | 0 | 0 | 1 | 0 |
| ['access', 'no'] | 0 | 0 | 1 | 0 | 0 | 1 | 0 |
| ['access', 'without'] | 0 | 0 | 0 | 0 | 0 | 1 | 0 |
| ['stair'] | 3 | 0 | 4 | 0 | 5 | 2 | 0 |
| ['packed'] | 0 | 2 | 2 | 1 | 2 | 2 | 3 |
| ['crowded'] | 1 | 0 | 2 | 2 | 2 | 3 | 1 |
| ['narrow'] | 0 | 0 | 0 | 0 | 0 | 1 | 0 |
| ['packed', 'no'] | 0 | 0 | 1 | 0 | 0 | 1 | 1 |
| ['crowded', 'no'] | 0 | 0 | 1 | 1 | 1 | 1 | 1 |
| ['dark'] | 3 | 2 | 0 | 1 | 3 | 1 | 0 |
| ['elevator'] | 4 | 1 | 0 | 0 | 0 | 0 | 0 |
| ['accessible'] | 1 | 0 | 0 | 0 | 0 | 2 | 0 |
| ['loud'] | 1 | 1 | 3 | 0 | 3 | 2 | 3 |
| ['hard', 'hearing'] | 0 | 0 | 0 | 0 | 0 | 1 | 0 |
| ['food'] | 13 | 13 | 12 | 10 | 15 | 8 | 10 |
| ['best'] | 4 | 5 | 3 | 6 | 3 | 2 | 2 |
| ['worst'] | 3 | 4 | 5 | 3 | 2 | 3 | 1 |

Table 13 shows an example of the weighted six-dimensional description for each vector.

TABLE 13

| | TAG | Motion | Sensory | Sound | Vision | Ref |
|---|---|---|---|---|---|---|
| Alo | | 0.08 | −0.24 | −0.08 | −0.40 | 1.60 |
| Canoe | | −0.08 | −0.15 | −0.15 | −0.31 | 1.69 |
| Firkinon on Bloor | | −1.63 | −0.89 | −0.89 | 0.00 | 2.96 |
| George Street Diner | | −0.19 | −0.19 | 0.00 | −0.19 | 1.82 |
| GUSTO101 | | −0.67 | −0.67 | −0.50 | −0.50 | 1.67 |
| PAI_rev | 1 | −5.42 | −1.14 | −1.14 | 0.00 | 3.71 |
| Sabisabai | | −0.31 | −0.31 | −0.93 | 0.00 | 2.01 |

Figure 30:
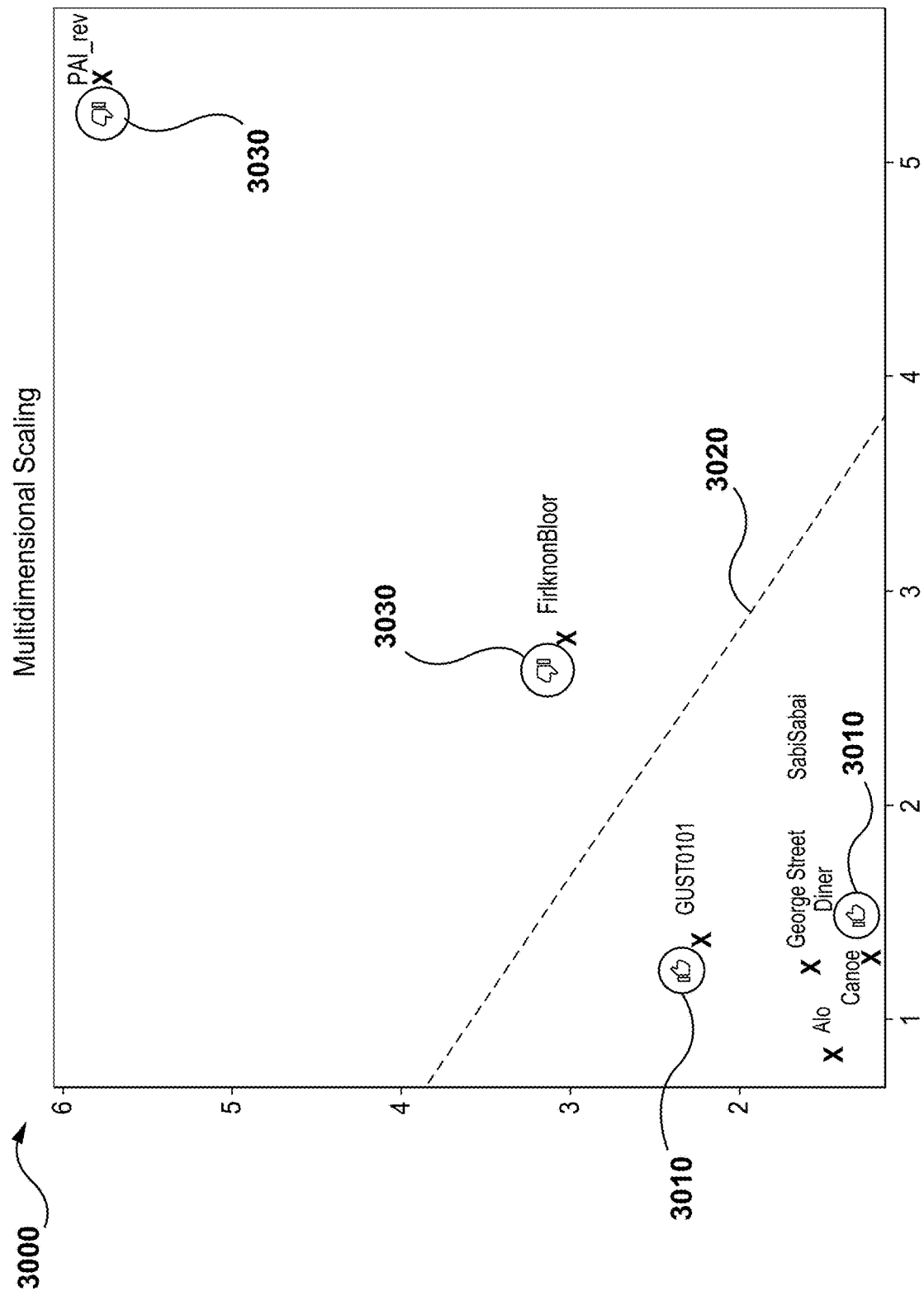
FIG. 30 shows a graph of an example of a multidimensional map produced by the system of FIG. 1.

FIG. 30 shows an example of a multidimensional map 3000. The multidimensional map shows a tagged location (according to an existing crowdsourced database). The linear separation 3020 (dotted line) between the accessible 3010 and inaccessible restaurants 3030 can be seen.

In at least one embodiment, the system 100 (or any component of components thereof) is operated by a person (or other entity, such as another computing system, a business organization, or a bot) to perform an accessibility audit. Such an audit might be performed in order to adhere to a governmental requirement. For example, a government auditor or an independent business owner may employ the user device 110 to access the server 120 in order to operate any one of the programs 142 stored theron to perform method 200 and/or method 300. As such, the user device 120 can use an API to access the database 150 and an application to display the accessibility data and the accessibility tags on the user device 120 customized to at least one disability. Alternatively, or in addition, the user device 120 can use the API to create a user interface and/or program an application that displays the accessibility data and the accessibility tags. The data displayed (e.g., the accessibility data and the accessibility tags) on the user device 120 may then be used to compare with existing standards on accessibility (e.g., pre-programmed onto the user device 120 by the auditor) or to be presented to a governmental body as an accessibility audit result.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. An automated system for assessing and rating accessibility comprising:
    at least one processor;
    a non-transitory computer-readable medium having stored thereon instructions that, when executed by the at least one processor, cause the at least one processor to carry out the steps of:
        collecting raw data corresponding to a plurality of geographical objects obtained from a plurality of sensors, the raw data comprising tagged and non-tagged data;
        operating on the raw data to extract features and reduce dimensionality of the raw data, thereby generating processed data having extracted features;
        generating accessibility data from the processed data;
        using supervised machine learning techniques to develop models from the processed data; and
        implementing the models and generating accessibility tags based on the extracted features;
    a database configured to store geographical data related to the plurality of geographical objects and the accessibility tags corresponding to the geographical locations; and
    an API configured to access the database and provide a user interface for a user device to use at least one application to display the accessibility data and the accessibility tags on the user device customized to at least one of a plurality of disabilities.

2. The automated system of claim 1, wherein the plurality of sensors produces the raw data from sensing vision, kinematics, sound, and comprehension.

3. The automated system of claim 1, wherein the plurality of sensors includes at least one vision sensor comprising one or more RGB cameras for: (a) capturing amounts of light based on field of view; (b) taking snapshots at particular time intervals; and (c) encoding image data digitally across R, G, and B color channels.

4. The automated system of claim 3, wherein the encoding the image data comprises using RGB pixel value scales, each pixel assigned a raw numerical value per R, G, and B color channels, such that raw numerical values analyzed by digital analysis and LiDAR sensors generate a point cloud map to estimate physical distance of objects detected in a field of view in relation to the at least one vision sensor.

5. The automated system of claim 1, wherein the generating the accessibility data from the processed data comprises at least one of:
    operating on the processed data to perform monocular depth estimation for indoor accessibility, thereby adding depth estimates to the accessibility data;
    operating on the processed data to perform sound analysis based on criteria of spectral analysis and time fluctuation analysis, thereby adding an assessment of sound accessibility to the accessibility data;
    operating on the processed data to perform data fusion of text and sound, thereby adding detection of a noisy environment to the accessibility data;
    operating on the processed data to perform data fusion of vision and kinematics, thereby adding detection of obstacles and physical inaccessibility issues to the accessibility data;
    operating on the processed data to perform depth mapping, thereby adding for trail accessibility to the accessibility data; or
    operating on the processed data to perform object detection using LIDAR sensor data, thereby adding detection of obstacles limiting or preventing accessibility in a captured environment to the accessibility data.

6. The automated system of claim 5, wherein the operating on the processed data to perform data fusion of vision and kinematics comprises correlating spatial and temporal data relating to an image of an object with kinematic measures of the object, the kinematic measures of the object include a statistically significant and observable change in a kinematic sensor output.

7. The automated system of claim 6, wherein the operating on the processed data to perform data fusion of vision and kinematics comprises correlating spatial and temporal data relating to an image of a step or ramp with kinematic measures of the step or ramp, the kinematic measures of the step including an abrupt change in acceleration.

8. The automated system of claim 1, wherein the accessibility tags comprise attributes that span an accessibility space describing features of an environment containing at least one of the plurality of geographical objects that are relevant to an aspect of accessibility.

9. The automated system of claim 1, wherein the plurality of geographical objects includes points, lines, polylines, polygons, and polyhedrons.

10. The automated system of claim 1, wherein the user interface provided by the API has functionality allowing the user device to develop and implement at least one application.

11. A method for assessing and rating accessibility comprising:
    collecting raw data corresponding to a plurality of geographical objects obtained from a plurality of sensors, the raw data comprising tagged and non-tagged data;
    operating on the raw data to extract features and reduce dimensionality of the raw data, thereby generating processed data having extracted features;
    generating accessibility data from the processed data;
    using supervised machine learning techniques to develop models from the processed data; and
    implementing the models and generating accessibility tags based on the extracted features; and
    providing an API configured to access a database and provide a user interface for a user device to use at least one application to display the accessibility data and the accessibility tags on the user device customized to at least one of a plurality of disabilities, the database configured to store geographical data related to the plurality of geographical objects and the accessibility tags corresponding to the geographical locations.

12. The method of claim 11, wherein the plurality of sensors produces the raw data from sensing vision, kinematics, sound, and comprehension.

13. The method of claim 11, wherein the plurality of sensors includes at least one vision sensor comprising one or more RGB cameras for: (a) capturing amounts of light based on field of view; (b) taking snapshots at particular time intervals; and (c) encoding image data digitally across R, G, and B color channels.

14. The method of claim 13, wherein encoding the image data comprises using RGB pixel value scales, each pixel assigned a raw numerical value per R, G, and B color channels, such that raw numerical values analyzed by digital analysis and LiDAR sensors generate a point cloud map to estimate physical distance of objects detected in a field of view in relation to the at least one vision sensor.

15. The method of claim 11, wherein the generating the accessibility data from the processed data comprises at least one of:
   operating on the processed data to perform monocular depth estimation for indoor accessibility, thereby adding depth estimates to the accessibility data;
   operating on the processed data to perform sound analysis based on criteria of spectral analysis and time fluctuation analysis, thereby adding an assessment of sound accessibility to the accessibility data;
   operating on the processed data to perform data fusion of text and sound, thereby adding detection of a noisy environment to the accessibility data;
   operating on the processed data to perform data fusion of vision and kinematics, thereby adding detection of obstacles and physical inaccessibility issues to the accessibility data;
   operating on the processed data to perform depth mapping, thereby adding for trail accessibility to the accessibility data; or
   operating on the processed data to perform object detection using LIDAR sensor data, thereby adding detection of obstacles limiting or preventing accessibility in a captured environment to the accessibility data.

16. The method of claim 15, wherein the operating on the processed data to perform data fusion of vision and kinematics comprises correlating spatial and temporal data relating to an image of an object with kinematic measures of the object, the kinematic measures of the object include a statistically significant and observable change in a kinematic sensor output.

17. The method of claim 16, wherein the operating on the processed data to perform data fusion of vision and kinematics comprises correlating spatial and temporal data relating to an image of a step or ramp with kinematic measures of the step or ramp, the kinematic measures of the step including an abrupt change in acceleration.

18. The method of claim 11, wherein the accessibility tags comprise attributes that span an accessibility space describing features of an environment containing at least one of the plurality of geographical objects that are relevant to an aspect of accessibility.

19. The method of claim 11, wherein the plurality of geographical objects includes points, lines, polylines, polygons, and polyhedrons.

20. The method of claim 11, wherein the user interface provided by the API has functionality allowing the user device to develop and implement at least one application.

* * * * *